US006640219B2

(12) United States Patent
Fernandes et al.

(10) Patent No.: US 6,640,219 B2
(45) Date of Patent: Oct. 28, 2003

(54) ANALYZING DATA FILES

(75) Inventors: Llewelyn Ignazio Fernandes, London (GB); Rachel Hammond, London (GB)

(73) Assignee: Applied Psychology Research Limited, London (GB)

( * ) Notice: Subject to any disclaimer, the term of this patent is extended or adjusted under 35 U.S.C. 154(b) by 0 days.

(21) Appl. No.: 09/295,290

(22) Filed: Apr. 20, 1999

(65) Prior Publication Data

US 2002/0165851 A1 Nov. 7, 2002

(30) Foreign Application Priority Data

Apr. 24, 1998 (GB) .............................................. 9808799

(51) Int. Cl.$^7$ ............................................ G06F 17/30
(52) U.S. Cl. ...................... 707/3; 707/1; 707/2; 707/5; 707/4; 707/10; 707/100
(58) Field of Search ..................... 707/1–5, 10, 100; 705/1–14; 706/47, 50

(56) References Cited

U.S. PATENT DOCUMENTS

| | | | |
|---|---|---|---|
| 4,965,763 A | | 10/1990 | Zamora |
| 5,428,778 A | | 6/1995 | Brookes |
| 5,537,586 A | * | 7/1996 | Amram et al. .............. 395/600 |
| 5,619,709 A | | 4/1997 | Caid et al. |
| 5,926,811 A | * | 7/1999 | Miller et al. .................... 707/5 |
| 6,038,560 A | * | 3/2000 | Wical ............................. 707/5 |
| 6,134,532 A | * | 10/2000 | Lazarus et al. ................ 705/14 |
| 6,154,213 A | * | 11/2000 | Rennison et al. ............ 345/356 |

OTHER PUBLICATIONS

"SCISOR: Extracting Information from On–line News"; Communications of the ACM, vol. 33, No. 11; Nov. 1990; Paul S. Jacobs and Lisa F. Rau; p. 88–97.
"Information Filtering Via Hill Climbing, Wordnet, and Index Patterns"; Information Processing & Management; vol. 33, No. 5; 1997 p. 633–644.

* cited by examiner

Primary Examiner—Kim Vu
Assistant Examiner—Cam-Y Truong
(74) Attorney, Agent, or Firm—Frishauf, Holtz, Goodman & Chick, P.C.

(57) ABSTRACT

Data files (205) are categorised in order to facilitate the searching for information. The analysis is performed in order to identify items which may be considered as having high value without actually being directly specified. Occurrences of unspecified candidate items are identified (207) in contexts for a preferred specified category. Occurrences of unspecified candidate items are identified (209) in non-preferred contexts. The preferred occurrences are processed (211) with the non-preferred occurrences for each candidate item in order to select candidate items as being high value items. In the preferred embodiment, data relating to companies is identified without specific company names being defined.

42 Claims, 41 Drawing Sheets

```
.SID.OIL-INDUSTRY

* .SID.oil-industry-ti

** <Field>
        / definition = "title <Contains> 'oil companies'"

** <Field>
        /definition = "title<Contains> 'oil firm'"

** 0.65 <Field>
        /definition = "title <Contains> 'oil industry'"

** 0.30 <Field>
        /definition = "title<Contains> 'crude oil'"

.SID.oil-industry-comb
*

**  0.40 <Many> <Phrase>

"oil"
*** "industry"

***
  0.40 . SID.oil-industry-mkt
*   'buying oil from'

**  0.30   <Many> <Sentence>

**    <Any>

***   <Many> <Stem>

```
company 1

*    0.30  < Accrue.Candidate >
              /Category = "company"

**   0.30  < Phrase >
***       "shares in"

***  < Candidate >

**   0.25    < Phrase >

***  "Merger between"

< Candidate List >
***
**   0.20     < Phrase >

***  < Candidate >

***  " a major conglomerate "

**   0.30  < Phrase >

***  < Candidate >

***  " recently purchased "

*** < Skip >

***    / count = " 3 "

" share in "

SCORE 1-[(1 - A) (1 - B) (1 - C) . . . (1 - X)]

| 2501 CANDIDATE | 2502 COMPANY NAME | 2503 PERSONAL NAME | 2504 PLACE NAME | 2505 EXCLUDED NAME |
|---|---|---|---|---|
| Last Christmas | 0 | 0 | 0 | 0.2 |
| Jou Ku | 0.2 | 0.48 | 0 | 0.2 |
| Bankok | 0 | 0.23 | 0.67 | 0.1 |
| Thai Airways | 0.78 | 0.13 | 0 | 0 |
| Spice Girls | 0.6 | 0 | 0 | 0.7 |
| Hong Kong | 0.21 | 0 | 0.99 | 0 |
| Marks & Spencer | 0.6 | 0 | 0 | 0 |
| Marks | 0.5 | 0 | 0 | 0 |
| Spencer | 0.55 | 0.3 | 0 | 0 |
| Glaxo & Beecham | 0.57 | 0 | 0 | 0 |
| Glaxo | 0.6 | 0 | 0 | 0 |
| Beecham | 0.49 | 0.1 | 0 | 0 |
| - - | - - | - - | - - | - - |

*Figure 25*

| CANDIDATE | COMPANY NAME | PERSONAL NAME | PLACE NAME | EXCLUDED NAME |
|---|---|---|---|---|
| Thai Airways | 0.78 | 0.13 | 0 | 0 |
| Marks & Spencer | 0.2 | 0.48 | 0 | 0.2 |
| Marks | 0.5 | 0 | 0 | 0 |
| Spencer | 0.55 | 0.3 | 0 | 0 |
| Glaxo & Beecham | 0.49 | 0.1 | 0 | 0 |
| Glaxo | 0.6 | 0 | 0 | 0 |
| Beecham | 0.49 | 0.1 | 0 | 0 |
| --- | --- | --- | --- | --- |
| --- | --- | --- | --- | --- |
| --- | --- | --- | --- | --- |

| CANDIDATE | COMPANY NAME | PERSONAL NAME | PLACE NAME | EXCLUDED NAME |
|---|---|---|---|---|
| Thai Airways | 0.78 | 0.13 | 0 | 0 |
| Marks & Spencer | 0.6 | 0 | 0 | 0 |
| Glaxo | 0.6 | 0 | 0 | 0 |
| Beecham | 0.49 | 0.1 | 0 | 0 |
| | | | | |
| | | | | |
| | | | | |
| | | | | |
| | | | | |
| | | | | |
| | | | | |

| COMPANY NAME 3701 | POINTER 3702 |
|---|---|
| Thai Airways | OF8912 |
| Marks & Spencer | 192AC3 |
| Glaxo | 516321 |
| Beecham | 3200FI |
| ⋮ | ⋮ |
| | |
| | |
| | |

*Figure 37*

| ADDRESS 3801 | FILE NAME 3802 | POINTER 3803 |
|---|---|---|
| OF8912 | Gib_tourism_5 | OF8A20 |
| OF8A20 | Resort_weather_921 | OF8193 |
| OFA193 | Weather_seeker_advice | 100AB1 |
| 100AB1 | [END] | 000000 |
| ⋮ | | |
| 192AC3 | Textiles.UK_97_3 | 20A21B |
| ⋮ | | |

*Figure 38*

*Figure 42* home

Your search is being performed on Company and will display the first 7 titles sorted by publication date.
Your are searching for documents with Company name Warner Bros.

| GET | ● Selected ○ Context ○ Price | Save Search |
|---|---|---|
| | | Create Alert |

4201

News

Displaying titles 1 to 7 of at least 933 records

1. ☐☑ <u>Monty's Bafta glory leaves Rowan without a bean</u> - INDEPENDENT - March 10th, 1998 (45 lines)
2. ☐☑ <u>Tuesday'sticket</u> - INDEPENDENT - March 10th, 1998 (12 lines)
3. ☐☑ <u>Barrel of laughs</u> - NEW STRAITS TIMES - March 10th, 1998 (45 lines)
4. ☐☑ <u>All the president's mien;Arts:Film</u> - THE TIMES - March 9th, 1998 (108 lines)
5. ☐☑ <u>ACTRESS OF MANY PARTS IS DIY STAR</u> - EVENING STANDARD - March 9th, 1998 (19 lines)
6. ☐☑ <u>People</u> - UNITED PRESS INTERNATIONAL - March 9th, 1998 (56 lines)
7. ☐☑ <u>The Arts: Clever ringmaster up to his tricks</u> Theatre - SUNDAY TELEGRAPH - March 8th, 1998 (84 lines)

<u>Next 7</u> home • Dossier • Portfolio • Alert Manager • Utilities • Client Resources • Help?

4202

ANALYZING DATA FILES

FIELD OF THE INVENTION

The present invention relates to analysing data files containing representations of natural language to identify unspecified high value items.

INTRODUCTION TO THE INVENTION

Database technology is known to which information is supplied to users in the form of text-based files, in preference to the more traditional organisation of data in numerical and tabular form. Several facilities are available on the Internet, commonly referred to as "search engines" which assist in the location of information. For the present purposes, it will be assumed that information represents a selection of data files, selected from a very large volume of available data files, which are of particular interest to a user.

The majority of known databases perform what has become known as "free text" searching, in which a user specifies words which they believe are contained within the target data files (that is the information of interest) as a mechanism for instructing a database supplier to retrieve files of interest. Problems with this technique are well known to users of the available search engines, particularly over the Internet. A simple enquiry can generate hundreds of thousands of "hits", the majority of which will tend to be totally irrelevant to the user's needs. Furthermore, other relevant files may be missed simply because they do not contain the specific chosen words. Thus, in the present context, engines are known for providing a level of filtering of available data but the provision of high value information to users by technical means presents a considerable problem.

Many data files may be classified with reference to categories and technical solutions have been put forward by the present applicant for the association of incoming data files with categories so as to facilitate the identification of information. However, a further problem arises in that particular types of information may often be of interest to users but, the characteristic which actually makes the items of interest is difficult to determine with reference to the incoming data file itself.

The work performed by the present inventors has been directed towards the identification of information relating to companies and financial transactions etc, although the procedures identified herein have much wider application. Thus, many users of the service provided by the present applicant under the trade mark "PROFOUND" consider up-to-date information in connection with companies of interest to be extremely valuable. However, when data is first received by the PROFOUND system, it is not known which companies will actually be of interest.

In order to facilitate subsequent searching and to enhance the availability of information of interest, it is known that any data files containing information relating to any companies are potentially of interest to users of the system in the future. However, the actual data files being processed would only tend to include references to the actual company names without any pointers stating something to the effect that "this is a company".

Data items of this type are referred to herein as unspecified high value items; unspecified in that it is their characteristic rather than their content which is of interest and of high value in that there is a high probability that users will identify an interest in files containing references to this item.

The present application therefore addresses the problem of identifying files containing unspecified high value items using technical means thereby allowing a large number of files to be processed in realistic time-scales and at realistic costs.

SUMMARY OF THE INVENTION

According to a first aspect of the present invention, there is provided apparatus arranged to receive data files from data sources and to categorise said data files to facilitate searching in response to user requests, wherein said data files contain unspecified high value items, comprising identifying means configured to identify occurrences of unspecified candidate items in preferred contexts for a preferred specified category and to identify occurrences of unspecified candidate items in non-preferred contexts; and processing means configured to process said preferred occurrences with said non-preferred occurrences for each candidate item and to select a candidate item as a high value item.

In a preferred embodiment, a first transmission means is included for continually supplying input data files from a plurality of sources.

Preferably, a second transmission means is included for supplying information to users in response to user requests.

According to a second aspect of the present invention, there is provided a method of analysing data files containing representations of a natural language to identify unspecified high value items, comprising steps of identifying occurrences of unspecified candidate items in contexts for a preferred specified category; identifying occurrences of unspecified candidate items in contexts for a non-preferred specified category; processing said preferred occurrences with said non-preferred occurrences for each candidate item; and selecting a candidate item as a high value item in response to said processing step.

In a preferred embodiment, occurrences of unspecified candidate terms are identified for a plurality of non-preferred categories. The preferred category may represent companies and non-preferred categories may include place names and personal names.

In a preferred embodiment, a plurality of processes are performed to remove candidates to produce a refined list of high value items. Identified occurrences may result in score values being increased and the processing steps may involve the processing of the score values. The score values may be increased non-linearly so as to restrain the scores within a predetermined maximum value. Similar entries may be identified and one or more of the similar entries may be removed in response to a score comparison. Similar entries may represent situations in which a first entry is the same as a second entry with an extension added thereto.

BRIEF DESCRIPTION OF THE DRAWINGS

FIG. 8 details the OTL file from which the display of FIG. 7 is generated;

FIG. 10 illustrates an outline file;

FIG. 25 shows a candidate scoreboard constructed from procedures identified in FIG. 24;

FIG. 27 shows a reduced list of candidate entries following procedures detailed in FIG. 26;

FIG. 36 shows the results of processing the candidate table shown in FIG. 27 in response to the procedures shown in FIG. 28;

FIG. 37 illustrates a preferred term table, having pointers to a linked list;

FIG. 38 details the linked list referred to in FIG. 37;

FIG. 42 illustrates the displaying of titles of associated files generated by the procedure shown in FIG. 39.

DETAILED DESCRIPTION OF THE PREFERRED EMBODIMENTS

Figure 1:
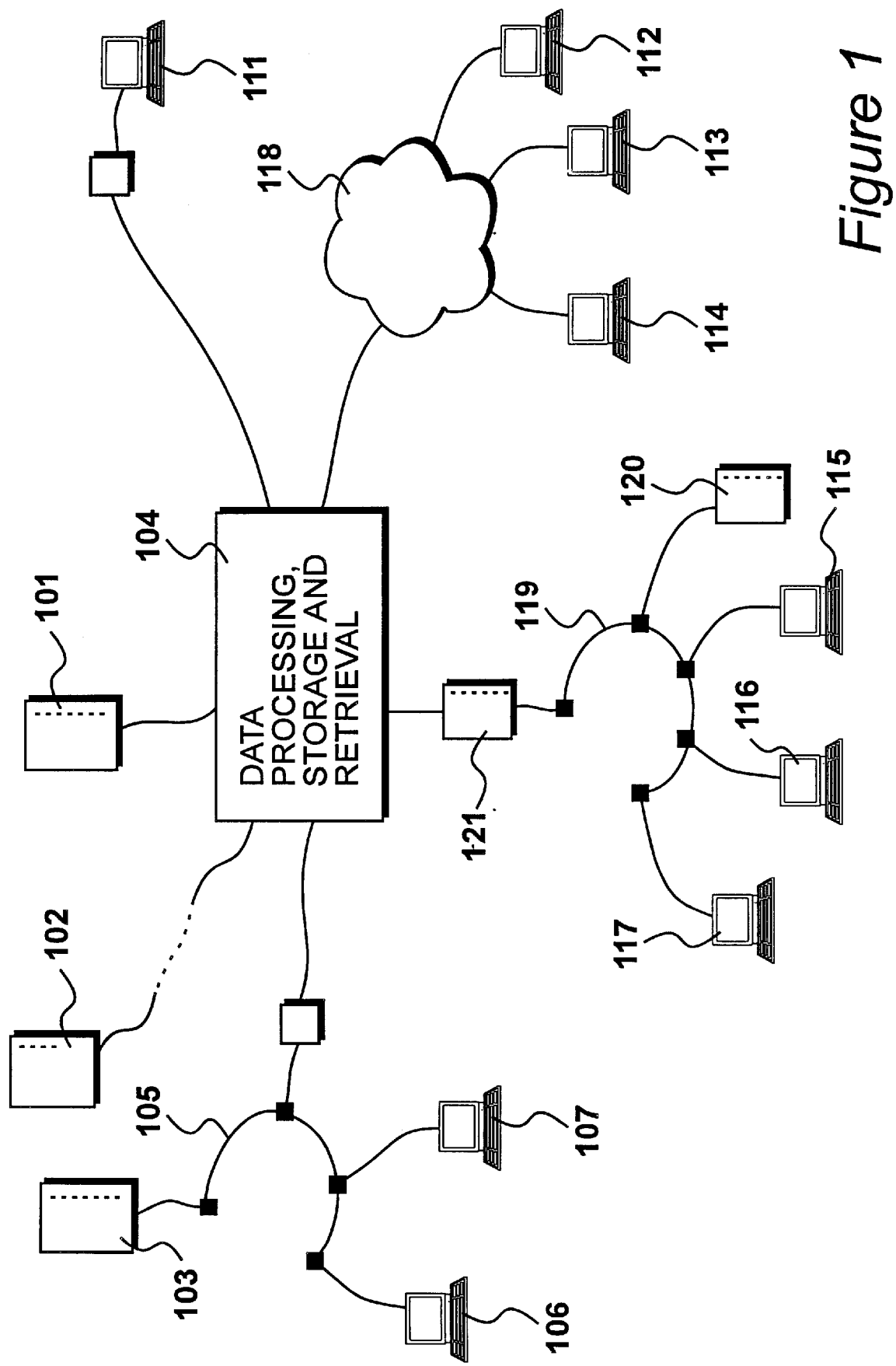
FIG. 1 shows a data distribution environment in which data is received from a plurality of data sources.

A data distribution environment is illustrated in FIG. 1 in which data, received from a plurality of data sources 101, 102, 103 is supplied to a data processing, storage and retrieval system 104. Data sources 101 and 102 supply data directly to processing system 104 while data source 103 supplies data via a local area network 105, thereby allowing user terminals 106 and 107 to gain direct access to their local data source 103.

All incoming data from data sources 101 to 103 is categorised with a key word in seven separate fields, comprising "market sector", "location", "company name", "publisher", "publication date" and "scope". Users, such as users 112 to 117 may specify almost any term as the basis for a search and are then prompted by an equivalent word or phrase which constitutes more preferred search parameters. For example, a user may specify a search word such as "confectionery" and the system will prompt the user to consider narrower terms such as "chocolate" along with related terms such as "cakes" or "desserts", or broader terms such as "food". From a simple request, a user is given an option of focusing further or of taking a broader overview of the subject under consideration.

The scope of an article refers to the context in which the document or article was written. For example, the scope field may consider questions as to whether the article concerns "mergers and acquisitions" or "seasonal trends" et cetera. Such terms are useful in gathering related information from a wide variety of industries and markets and may prove invaluable for particular applications.

The processing system 104 provides access to a plurality of users, such as users 111, 112, 113, 114, 115, 116 and 117. User 111 has direct access to the processing system 104 while users 112, 113 and 114 gain access to the processing system 104 via the Internet 118. Users 115, 116 and 117 exist within a more sophisticated environment in which they have access, via a local area network 119 to their own local database system 120 in addition to a connection, via an interface 121, to the data processing system 104.

Figure 2:
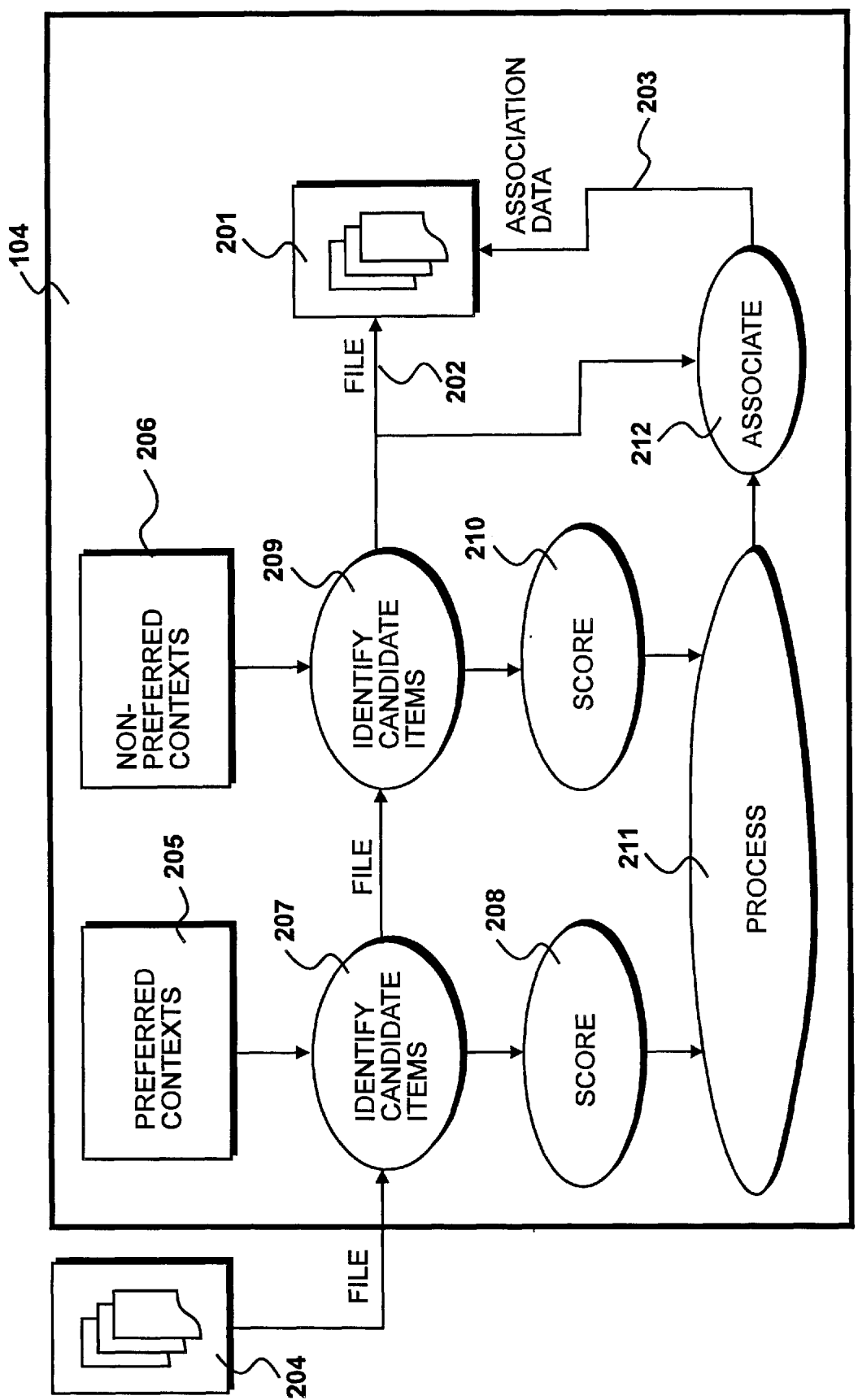
FIG. 2 shows an overview of procedures performed within the environment shown in FIG. 1.

In addition to identifying categories, processing system 104 is also configured to analyse incoming data files, containing representations of a natural language, to identify unspecified high value items. An overview of this process is illustrated in FIG. 2. The processing system 104 includes a database 201 arranged to store data files containing representations of natural language. In the preferred embodiment, representations of natural language are stored as text files but in alternative embodiments other representations could be used, such as audio files. To facilitate searching, the stored files are associated with categories, therefore the database 201 receives file data, illustrated by input line 202 and also receives association data, illustrated by input line 203 used to associate stored files with particular categories.

Incoming files, shown generally at 204 are received sequentially for writing to the database 201. The files are also processed in an attempt to identify association data and the purpose of the association data is to facilitate file searching such that, in response to a user's enquiry, the user is provided with high value information derived from an extremely large volume of available data.

The processing system includes details of preferred contexts, shown at 205 along with details of non-preferred contexts shown at 206. These contexts are defined by outline (OTL) files each relating to a particular category. The items are unspecified but are identified in relation to being included within particular contexts. Thus, preferred contexts 205 include contexts which suggests that an identified item is an example of the high value item. Similarly, the non-preferred contexts 206 provide evidence to the effect that an identified item is not an example of the high value item. In the preferred embodiment, several non-preferred contexts are included so as to enhance the selection of high value items; it being appreciated that a procedure of this type is undermined if high value items are wrongly identified.

A process 207 identifies occurrences of unspecified candidate items in contexts derived from the preferred contexts 205. Identifications are recorded, resulting in the generation of a score value, illustrated at 208.

A process 209 identifies occurrences of unspecified candidate items in contexts derived from the non-preferred contexts 206. Again, identifications are scored, as illustrated at 210.

A process 211 processes the preferred occurrences scored at 208 with the non-preferred occurrences scored at 201 for each candidate item. The scorings at 208 and 210 are compared and candidates are then selected on the basis of this comparison so as to provide high value items for association as illustrated at 212. Thus, the association process 212 generates association data on line 203, referencing a file as containing information relevant to a high value item.

The procedures illustrated in FIG. 2 are integrated with other procedures performed by the processing system 104 in order to make available a complete database of associated terms and items. The processing is also integrated in order to optimise the processing and transfer of data files.

Figure 3:
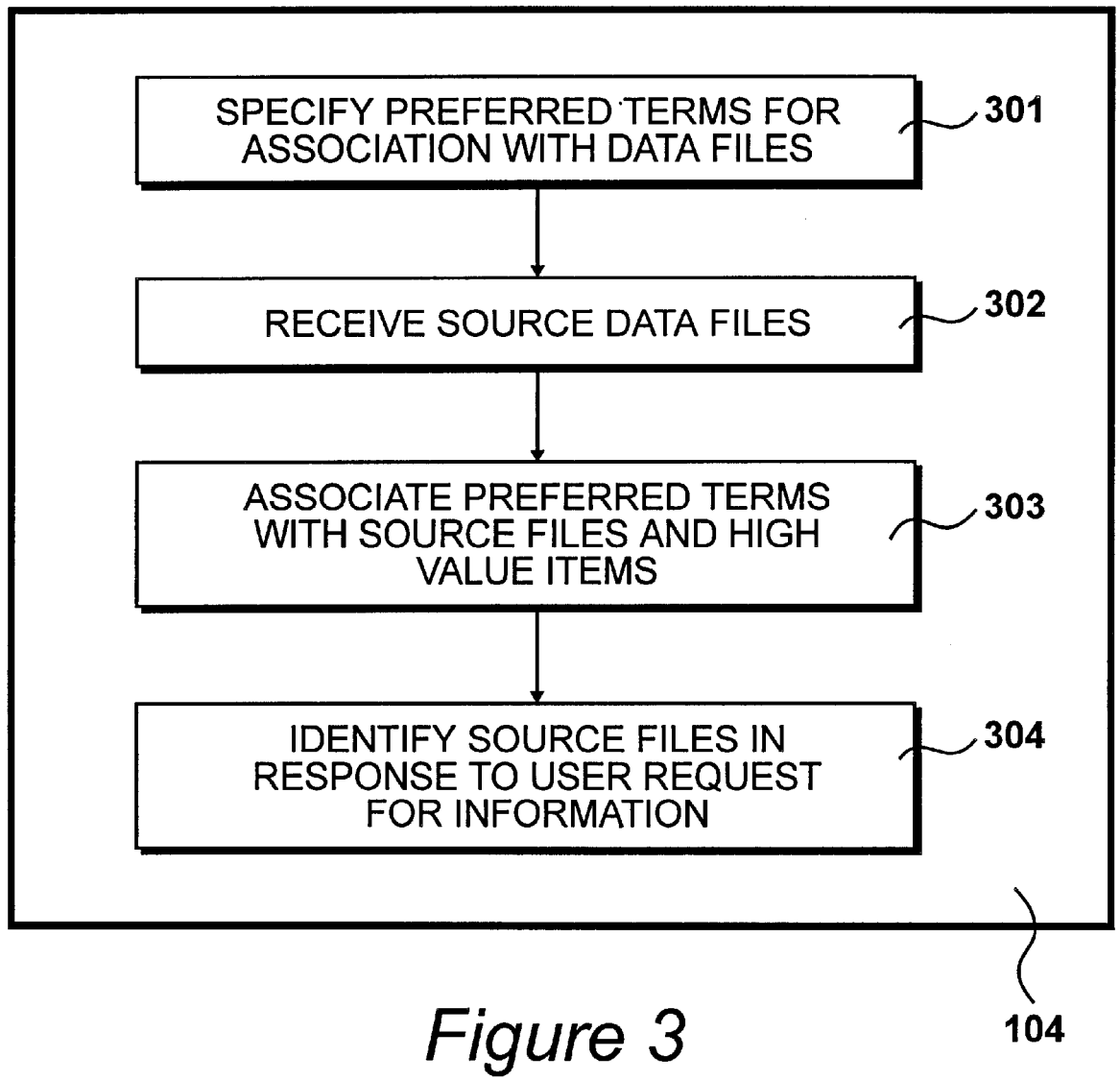
FIG. 3 shows procedures performed by a data processing, storage and retrieval system shown in FIG. 1.

Procedures implemented by data processing, storage and retrieval system 104 are identified in FIG. 3. At step 301 preferred terms are specified for association with data files. These preferred terms reference representations of natural language which actually occur within the file and may be detected by a direct analysis of the file.

At step 302 source data files are received and at step 303 preferred terms and high value items are associated with the source files. Thus, the preferred terms are specified but the high value items are not specified and must be identified by identifying their presence in contexts for a preferred specified category. Step 304 represents the on-line operation of the system in which source files are identified in response to a user request for information.

Figure 4:
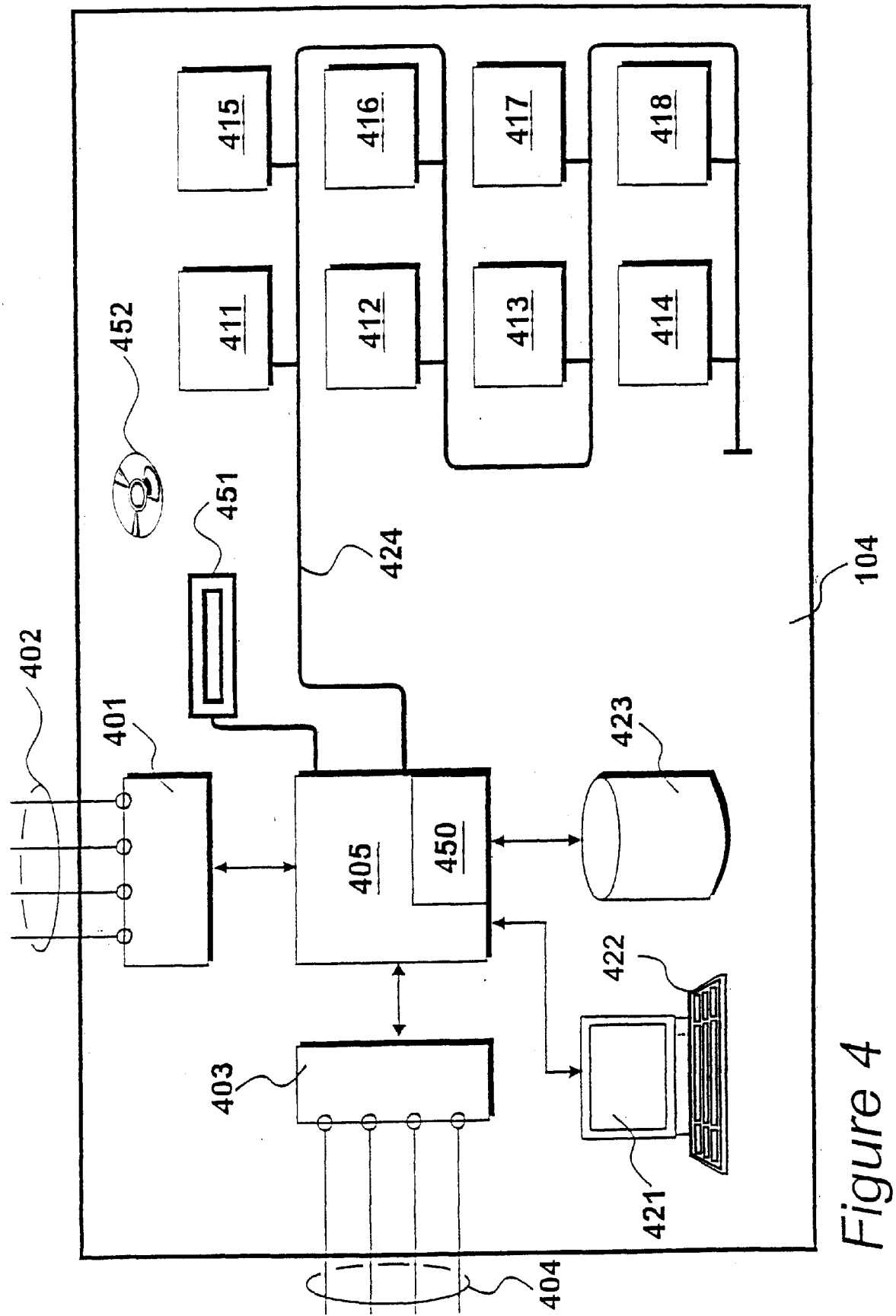
FIG. 4 details the data processing storage and retrieval system shown in FIG. 1.

Processing system 104 is detailed in FIG. 4. Data signals from data sources 101 to 103 are supplied to input interfaces 401 via data input lines 402. Similarly, output data signals are supplied to users 111 to 117 via an output interface 403 and output wires 404. Input interface 401 and output interface 403 communicate with a central processing system 405 based on DEC Alpha integrated circuitry. The central processing system 405 also communicates with other processing systems in a distributed processing architecture. Processing system 104 includes eight Intel chip based processing systems 411 to 418, each implementing instructions under the control of conventional operating systems such as Windows NT.

An operator communicates with the processing system 104 by means of an operator terminal, having a visual display unit 421 and a manually operable keyboard 422. Data files received from sources 101 to 103 are written to bulk storage devices 423 in the form of large magnetic disk arrays. Data files are written to disk arrays 423 after these files have been associated with preferred terms. These association processes are performed by the subsidiary processors 411 to 418 and the central processing system 405 is mainly concerned with the switching and transferring of data between the interface circuits 401, 403 and the disk arrays 423.

The central processing system 405 communicates with the subsidiary processors 411 to 418 via an Ethernet connection 424 and processing requirements are distributed between processors 411 to 418. Having addressed a subsidiary processor 411 to 418' the transferring of data to an addressed processor is performed. Each individual incoming data file is supplied exclusively to one of the subsidiary processors. The selected subsidiary processor is then responsible for performing the association process, to identify preferred terms relevant to that particular data file. Thereafter, the associated data file is returned to the central processing system 405, over connection 424 and the central processing system 405 is then responsible for writing the associated data file to the disk array 423. In this way, it is possible to scale the degree of processing capacity provided by system 104 in dependence upon the volume of data files to be processed in this way. The central processing system 405 also maintains a table 450 of categories, pointing to particular data files which have been identified as relevant to said categories. The facility includes a CD ROM reader 451, arranged to read CD ROM's, such as ROM 452. In this way, it is possible to install executable instructions for computer system 405 and for computer systems 411 to 418.

Figure 5:
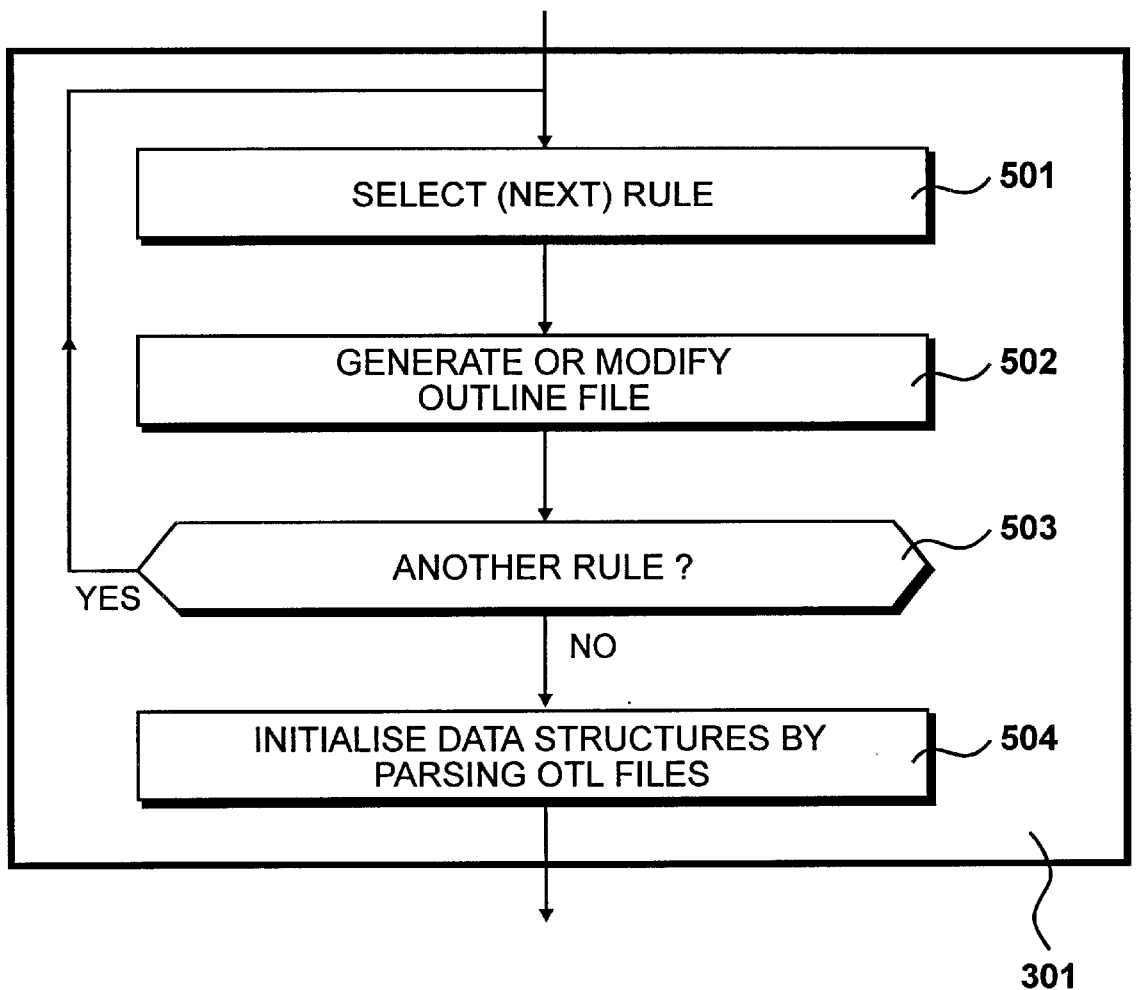
FIG. 5 details a process for specifying preferred terms for association with data files identified in FIG. 3.

Process 301 for specifying preferred terms for association with data files is detailed in FIG. 5. At step 501 a preferred term is selected and at step 502 an outline (OTL) file is generated or modified. At step 503 a question is asked as to whether another term is to be processed and when answered in the affirmative control is returned to step 501, allowing the next term to be processed at step 502. Eventually, all of the terms will have been processed resulting in appropriate generations or modifications to their related outline files. Consequently, the question asked at step 503 is answered in the negative whereafter at step 504 data structures are initialised by parsing the OTL files generated at step 502.

Figure 6:
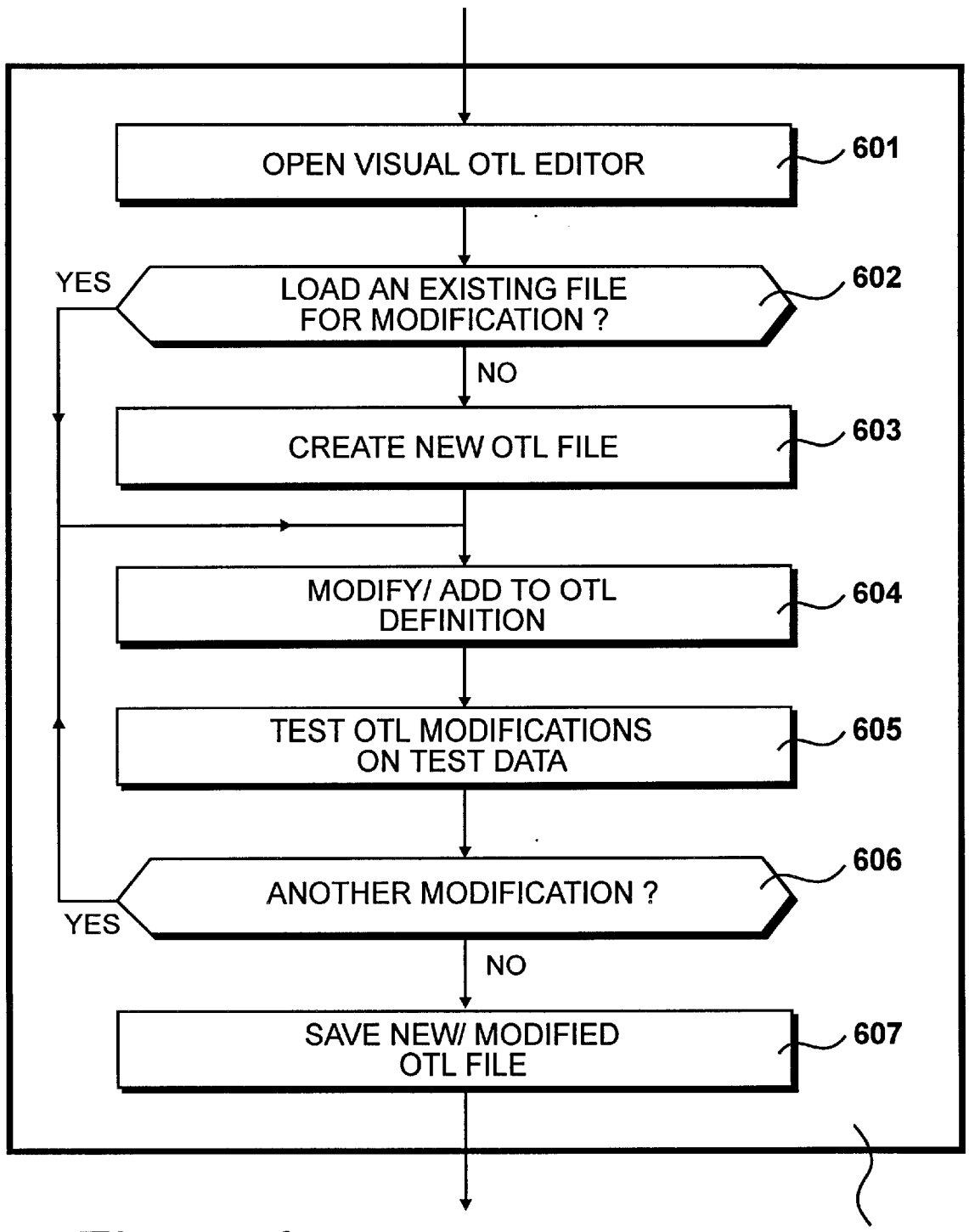
FIG. 6 details a process for the generation or modification of outline files identified in FIG. 5.

Process 502 for the generation or modification of outline files is detailed in FIG. 6. At step 601 a visual OTL editor is opened resulting in the editor's visual interface being displayed on VDU 421. At step 602 a question is asked as to whether an existing file is to be loaded for modification and if answered in the negative a new OTL file is created at step 603. If the question asked at step 602 is answered in the affirmative, step 603 is bypassed and at step 604 modifications or additions are made to the OTL definition. At step 605 the OTL modifications created at step 604 are tested on a sample of test data and at step 606 a question is asked as to whether another modification is to be made. When answered in the affirmative, control is returned to step 604 resulting in further modifications or additions being made to the OTL definitions. When answered in the negative at step 606, the new or modified OTL file is saved at step 607.

When performing modifications or additions at step 604, a graphical representation of the OTL file data is presented to an operator via the visual display unit 421. An example of a display of this type is illustrated in FIG. 7, representing a graphical illustration of a specific OTL file.

Figure 7:
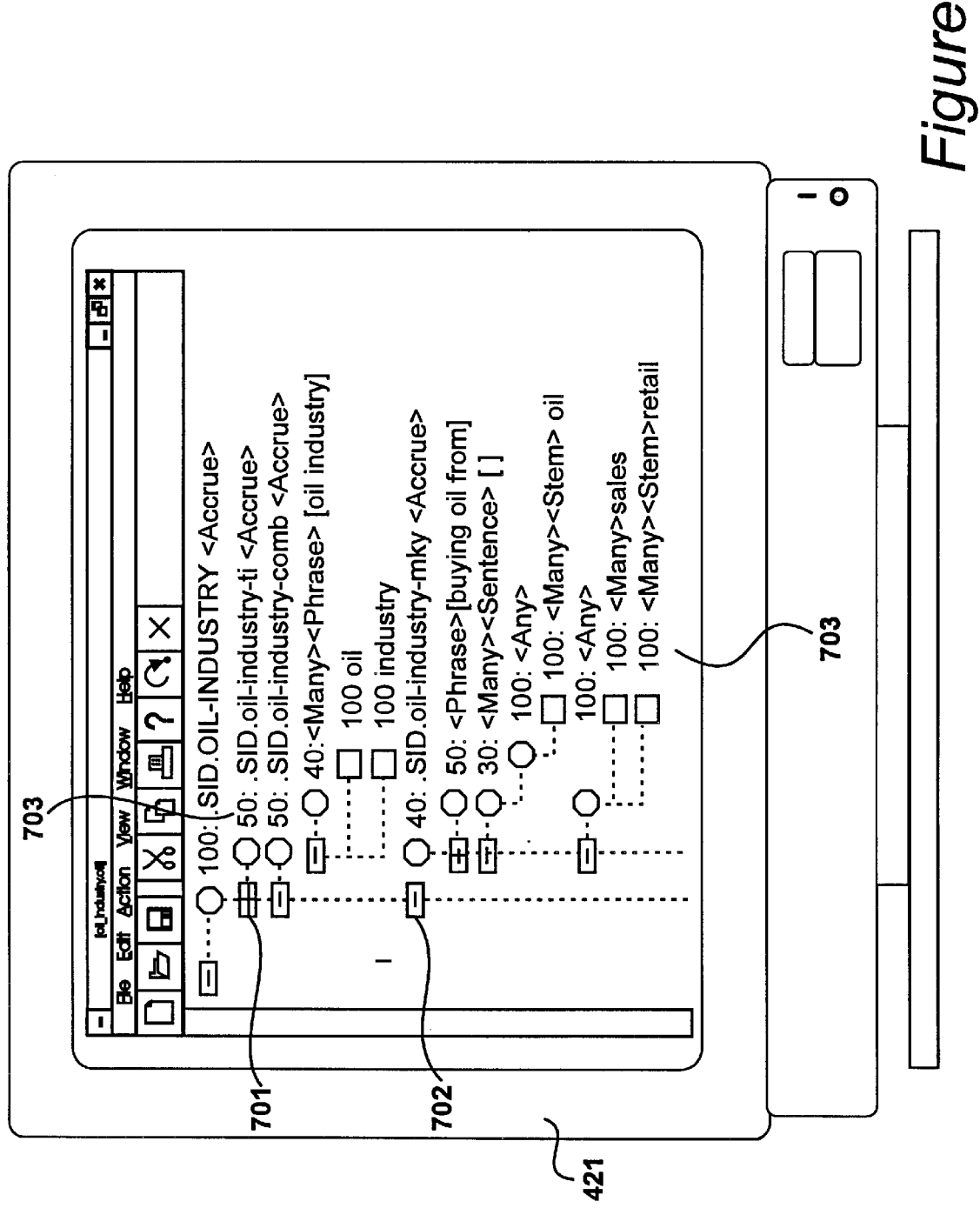
FIG. 7 illustrates a visual display unit showing a graphical representation of an OTL file.

The OTL file stores definitions in a hierarchical tree structure and this structure is represented in the graphical view as shown in FIG. 7. A representation of the tree may be contracted or expanded and the possibility of expanding a particular branch is identified by a plus sign on a particular line, as shown at 701. Similarly, when a particular branch has been fully expanded, the line is identified by a minus sign as shown at 702. Definitions within the file consist of rules, words and labels. The labels allow relationships to be defined between various parts of the file and between individual files themselves. The words identify specific words within an input file of interest and the rules define how and what weights are to be attributed to these words. Each rule line includes, at its beginning, a weight value 703 representing the score that will be attributed when a particular rule condition is met. Rules may also have leaves and the rule defines the way in which scores generated from leaves are combined.

OTL file data represented graphically in the form shown in FIG. 7 is actually stored in a data file having a format of the type shown in FIG. 8. The actual data file shown in FIG. 8 corresponds to the data display in FIG. 7 but in FIG. 8 all of the data, some of which has been rolled up in FIG. 7, is present. The data contained within the file shown in FIG. 8 is manipulated interactively by an operator in response to the graphical interface displayed as illustrated in FIG. 7. Score values 703 are also identified in the data file shown in FIG. 8.

Figure 9:
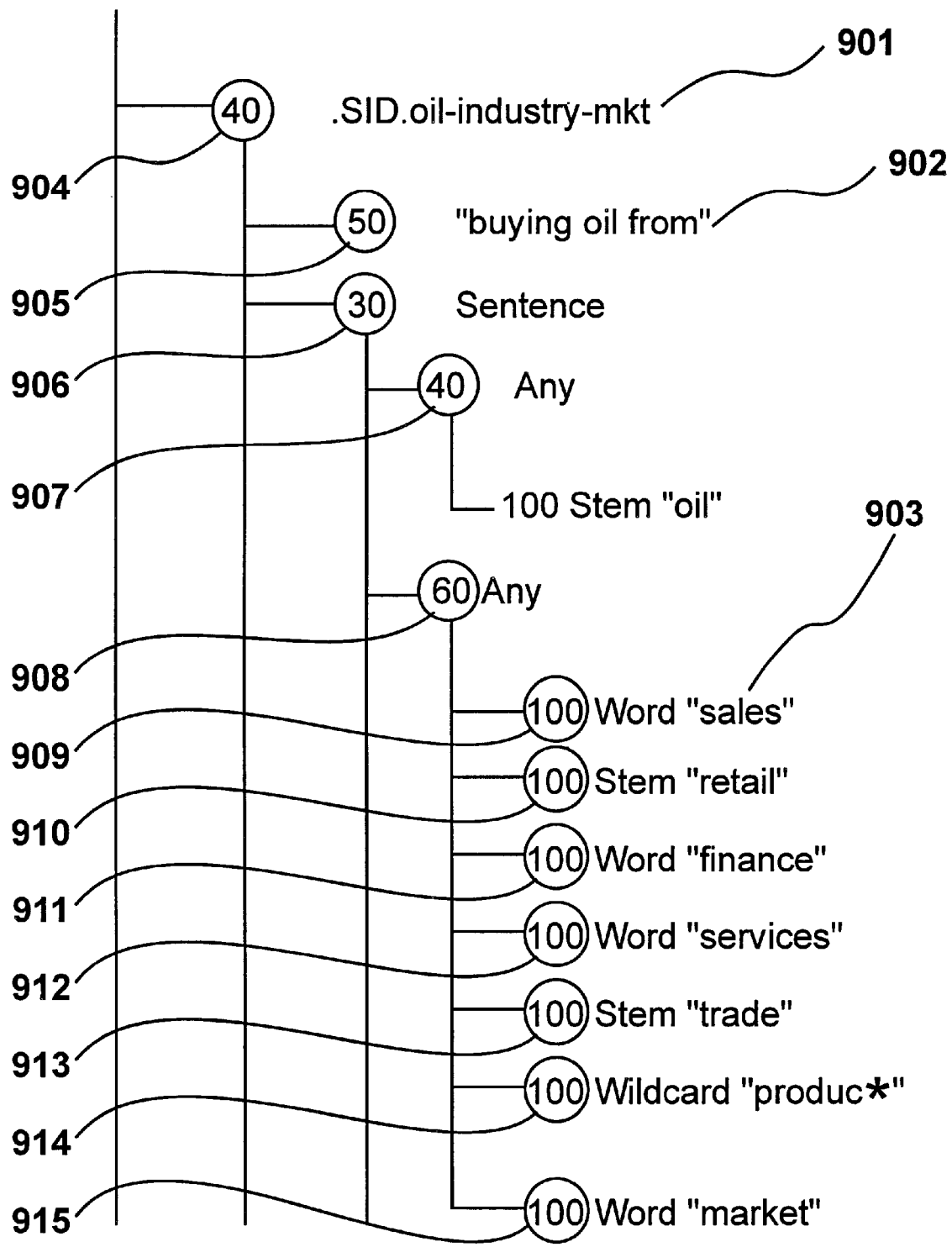
FIG. 9 shows a diagrammatic representation of the file shown in FIG. 8.

Displayed line 701 in FIG. 7 is generated from line 801 of the actual stored data. The syntax of the language used for recording the data, as illustrated in FIG. 8, may vary and the example shown is specific to this particular application. However, the underlying functionality of the language may be considered with reference to the diagrammatic representation shown in FIG. 9.

Purely to provide a specific example, this particular outline file is concerned with the topic of the oil industry and therefore the purpose of the OTL file is to identify words and phrases within an input file so as to provide an indication as to how relevant that input data is to users having an interest in the oil industry. Thus, the purpose of procedures exploiting these OTL files is to generate evidence showing that a particular data file conveys information which may be of interest to those studying the oil industry.

The outlines analyse data files in order to produce numerical evidence as to the relevance of a particular file with relation to a particular topic. The OTL definitions and structures are determined empirically and would be modified and upgraded over a period of time. The system does more than merely register the existence of a particular word item by placing the word items within an interacting structure; the nature of which is illustrated in FIG. 8.

The particular entry, given label "oil-industry-mkt" relates to marketing aspects of the oil industry and as such can contribute to an overall score as to the pertinence of incoming data to this particular topic. The first line 901 shows that this particular contribution may provide a total score of forty percent. This total of forty percent is then subdivided such that at line 902 the presence of the phase "buying oil from" has a score of fifty percent. Thus, the total contribution made the presence of this phrase consists of fifty percent of forty percent, ie a total of twenty percent being made to the total contribution. Similarly, as shown at line 903 and below, particular words may be identified which result in contributions of sixty percent of thirty percent of forty percent. Thus, a complete OTL file is structured in this way with particular words and phrases making contributions to an overall score value. These words and phrases may also be specified in the rules as making single contributions or being allowed to accrue.

The preferred contexts 205 and the non-preferred contexts 206 are defined by outline (OTL) files of the type illustrated at 1001 in FIG. 10. The purpose of the OTL file is to define rules for the identification of terms or items which fall within a specified category. As used herein, terms are items which may be identified directly. However, the purpose of the file shown in FIG. 10 is to identify high value items which, although belonging to a particular category, are so wide ranging that it would not be possible to provide a complete list of all potential high value items.

For the purposes of illustration, the high value items are company names. Grammatically, company names are identified as proper nouns but there are many other proper nouns which are not company names. The process is refined by identifying candidates as example items for the preferred specified categories. The evidence for being a high value item is then compared, resulting in candidates being removed from the candidate list and the remaining items being selected for inclusion in the list of high value items.

A preferred context OTL is defined by rules which are likely to met if a high value item is present. Thus, the process of the present invention is accomplished if it is possible to identify rules which, although not defining specific examples of the high value item, specify other items which will tend to be found in close proximity to the high value item.

In the example given, high value items fall within the category of companies. Thus, the purpose of the procedure is to identify data files which include information relating to companies, without actually providing a list of companies for which information files are required. Thus, it is not necessary to establish a list of companies nor is it necessary to maintain such a list. Files relating to companies are identified by a technical process, once an OTL file has been defined identifying other items which are often found in close proximity to company names.

In the example given as shown in FIG. 10, candidates are identified by particular phrases occurring within the file; the examples being "shares in", "merger between", "a merger conglomerate", "recently purchased" and "share in", etc. OTL files of this type would be developed over a period of time and modified as language relating to companies develops.

Figure 11:
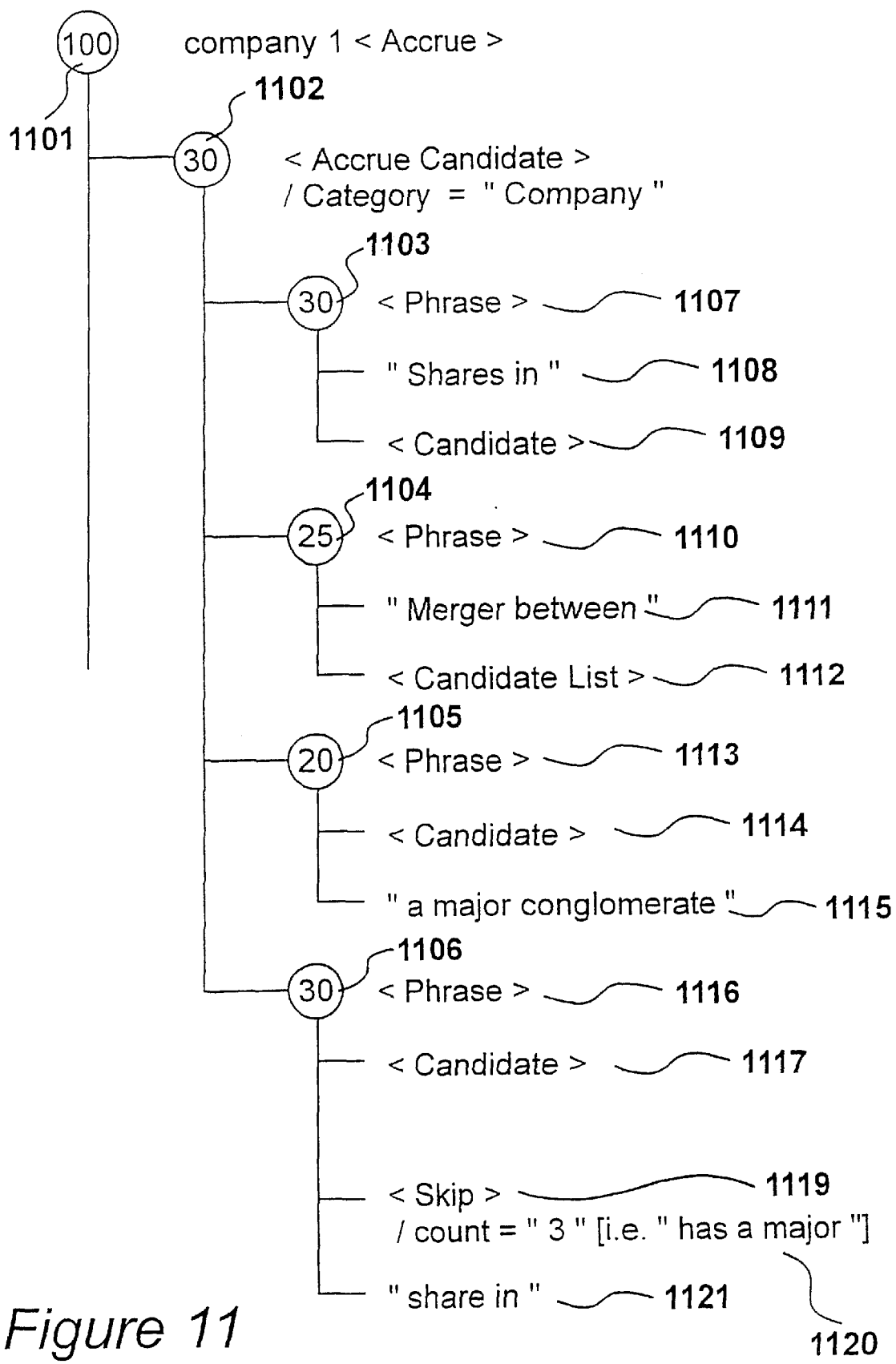
FIG. 11 shows a structural representation of the file shown in FIG. 10.

A structural presentation of file 1001 is illustrated in FIG. 11. The structure includes score values 1101 to 1106 at branches of the hierarchy. These score values are enabled when a particular test is satisfied and a total score is produced by combining score values which lie within the hierarchy between the test and the root. Thus, score 1103 is derived from a first test, score 1104 is derived from a second test, score 1105 is derived from a third test and score 1106 is derived from a fourth test. If the first test is satisfied, the score value at 1103 is combined with the score value at 1102 which is also combined with the score value at 1101. The way in which these score values are combined may vary but, generally, the values will accrue such that as more tests are satisfied, the total value approaches a maximum of one hundred percent.

The functions defining rules to be met are specified by angled brackets and a test is initiated by the function <phrase> followed by the conditions of the function. A first function includes <phrase> at 1107 followed by the context of an item and the item itself. Thus, at 1108 the context is specified as "shares in" and this is then followed by the actual candidate at 1109. Thus, the test will search for identifiable phrase "shares in". On identifying this phrase within a file, the process then captures the following proper noun phrase as a candidate. Thus, the actual candidate itself has not been specified in the OTL file but any proper noun phrase following the words "shares in" will then become a candidate as being a company name.

A second test is specified by the function <phrase> at 1110 in which the context "merger between" specified at 1111 results in the following noun phrase being captured as a candidate at 1112. The phrase defined at 1113 places its candidate noun phrase at 1114 before a captured context at 1115. Thus, this test will identify the occurrence "a major conglomerate" as a context and the noun phrase preceding this context will then be identified as the candidate. Thus, it can be appreciated that the candidate can exist before or after the capturing context.

A further function is defined by <skip>. The function <skip> allows words present between the capturing context and the candidate term to be ignored. The phrase is initiated at step 1116 and in this example the context requires the candidate noun phrase to precede the capturing context. The capturing context is, in this example, the phrase "share in" and the <skip> function at 1119 instructs the process to ignore, in this example, three words between the candidate and the capturing context. Thus, the rule will be met by the phrase "candidate has a major share in". The "share in" portion has effected the capturing, three words preceding this in the form "has a major" have been ignored and the word preceding this is recorded as the candidate.

OTL functions used by the preferred embodiment may be identified in a complete list, as follows: <Accrue>, <Phrase>, <Skip>, <Exclude>, <Trim>, <Include> and <Capture>.

Figure 12:
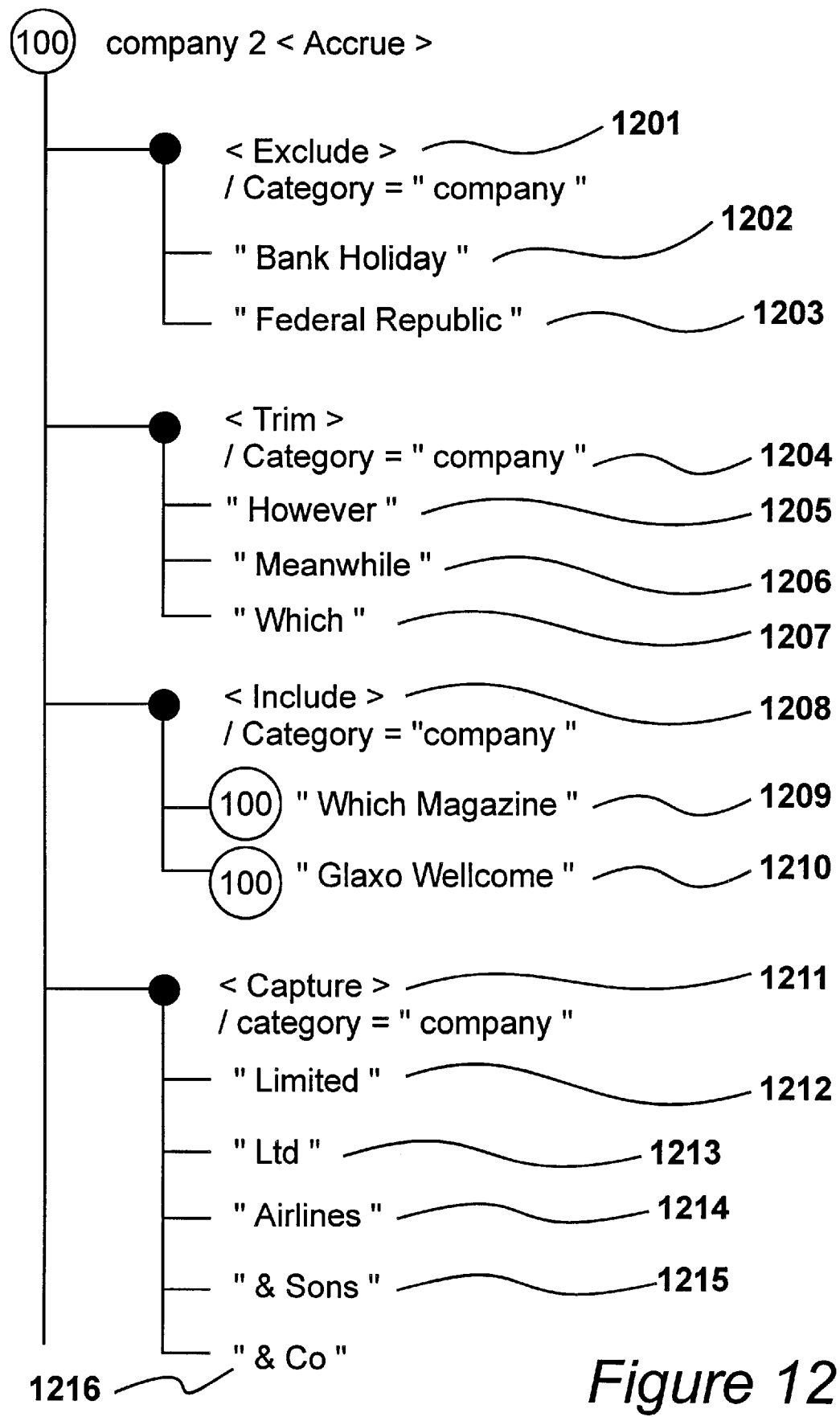
FIG. 12 illustrates examples of other functions definable within an outline file.

Examples of the functions <Exclude>, <Trim>, <Include> and <Capture> as shown at 1201, 1204, 1208 and 1211 respectively in FIG. 12. <Exclude> defines well known phrases which may be captured by other rules within the file and if so captured should be removed and dismissed as candidates. In this example, such excluded items may be identified due to the presence of capital letters and examples are given at 1202 and 1203 as "Bank Holiday" and "Federal Republic".

The <trim> rule shown at 1204 trims candidates which have been selected by other rules. In the example given, words may be included incorrectly due to the start of a sentence, for example. Thus, if the words "However", "Meanwhile" or "Which" are included in a candidate noun phrase. These particular words are removed while retaining the rest of the noun phrase.

The capture function increases the scores in categories for proper noun phrases containing the specified words. In this example, the phrases "Company", "Limited", "Ltd", "Airlines", "Sons", and "& Co" are specified. The include function allows noun phrases to be included which without doubt, should be placed in the category.

The accrue function allows scores to be captured in such a way that repeated triggering increases the overall score while at the same time maintaining the score within a maximum value of unity or as one hundred percent.

Figures 13A, 13B:
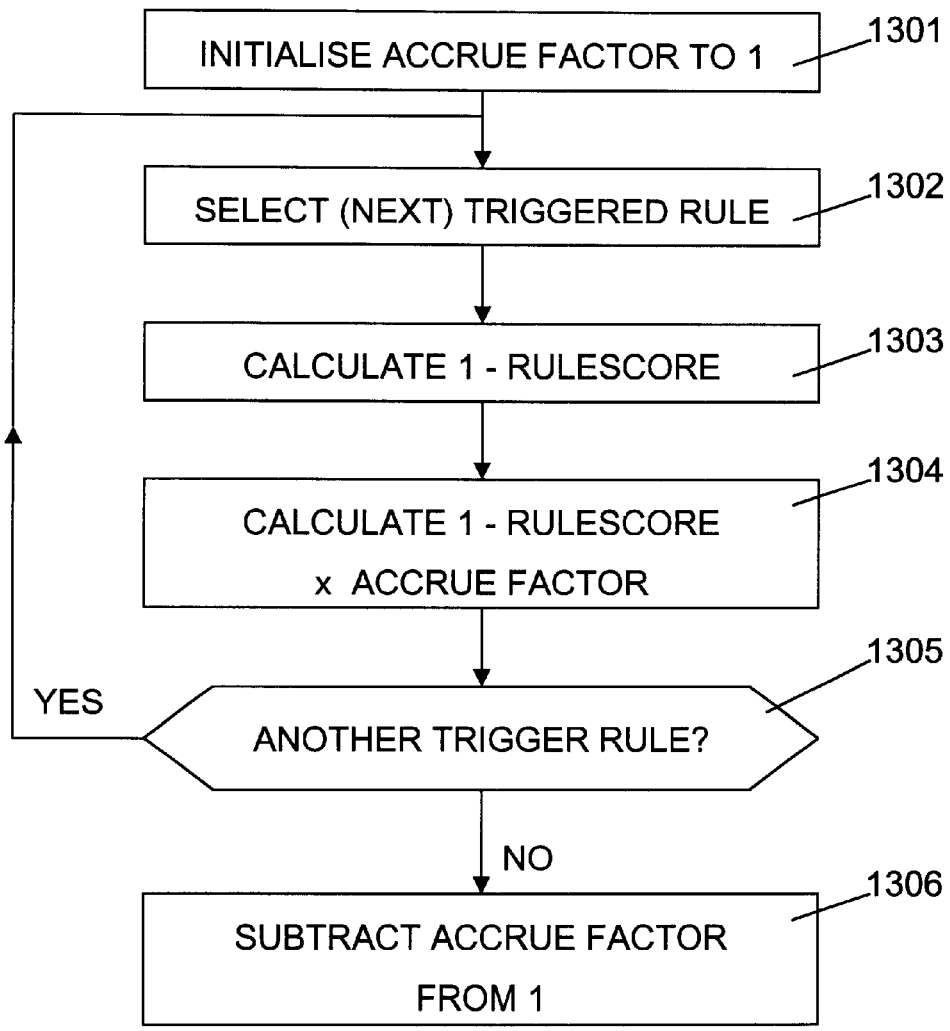
FIGS. 13A and 13B illustrate operations performed in response to an accrue function.

Operations performed in response to the accrue function are detailed in FIG. 13A performed with reference to factors ranging from zero to one. At step 1301 an accrue factor is initialised to one and at step 1302 a triggered rule is selected. At step 1303 the rule score determined at step 1302 is subtracted from unity and at step 1304 the accrued factor is multiplied by one minus the rule score. At step 1305 a question is asked as to whether another triggered rule is present and when answered in the affirmative control is returned to step 1302. Eventually, all of the triggered rules will have been considered and the accrue factor is then subtracted from unity at step 1306.

The procedure illustrated in FIG. 13A is shown algebraically in FIG. 13B.

Figure 14:
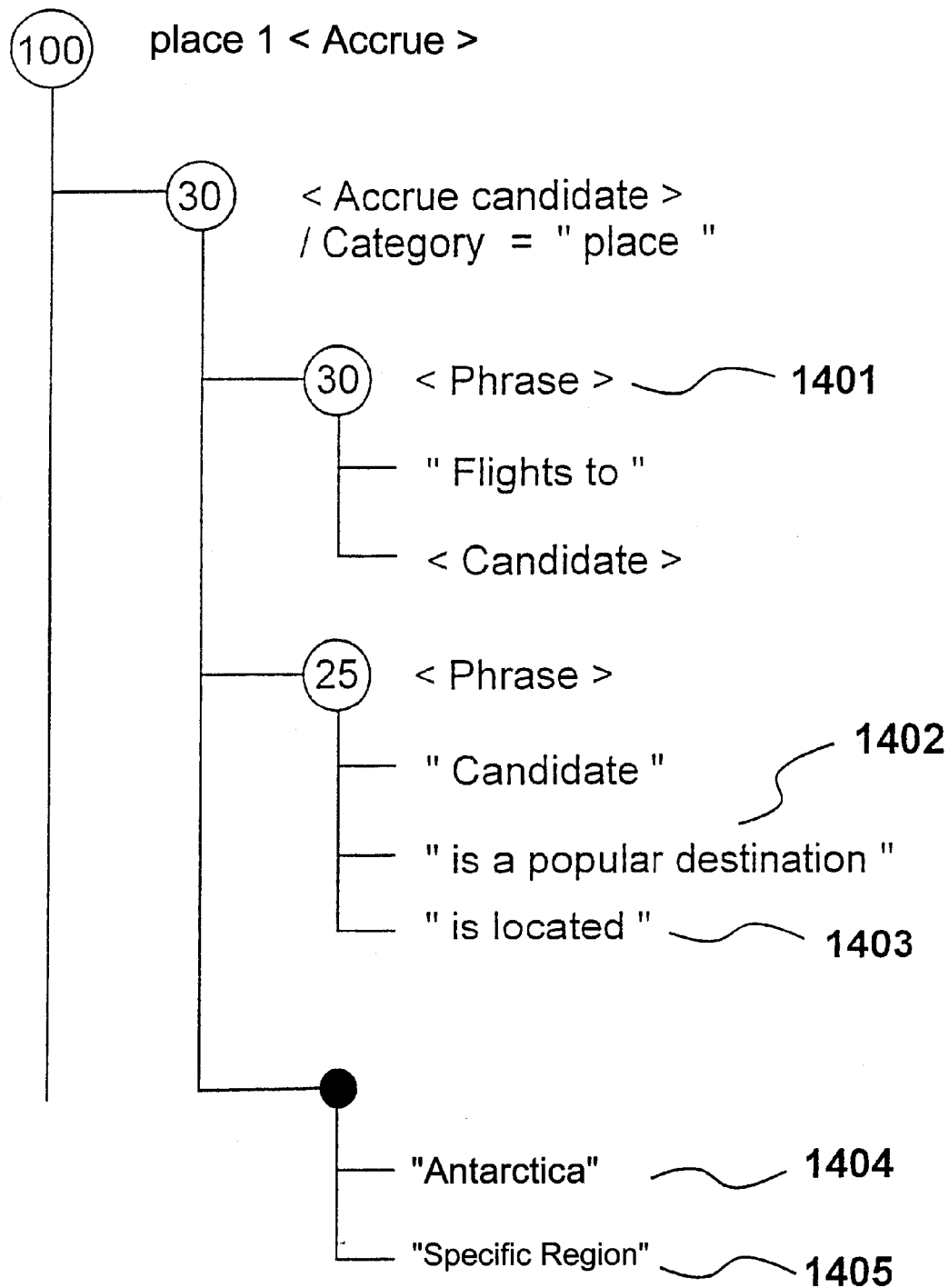
FIG. 14 illustrates an example of an outline file for place names.

The OTL files illustrated in FIG. 11 and FIG. 12 represent example for defining preferred contexts. A similar file for identifying candidates for the non-preferred category is illustrated in FIG. 14. In this example, the unspecified high value items are company names which, as proper nouns, will appear grammatically similar to personal names, place names and other easily identifiable excluded names.

An example of an OTL file for place names is shown in FIG. 14. Thus, contexts for inclusion within the non-preferred category have been identified by the phrases "flights to" at 1401, "is a popular destination" at 1402, "is located" at 1403, "Antarctica" at 1404 and "specific region" at 1405.

Figure 15:
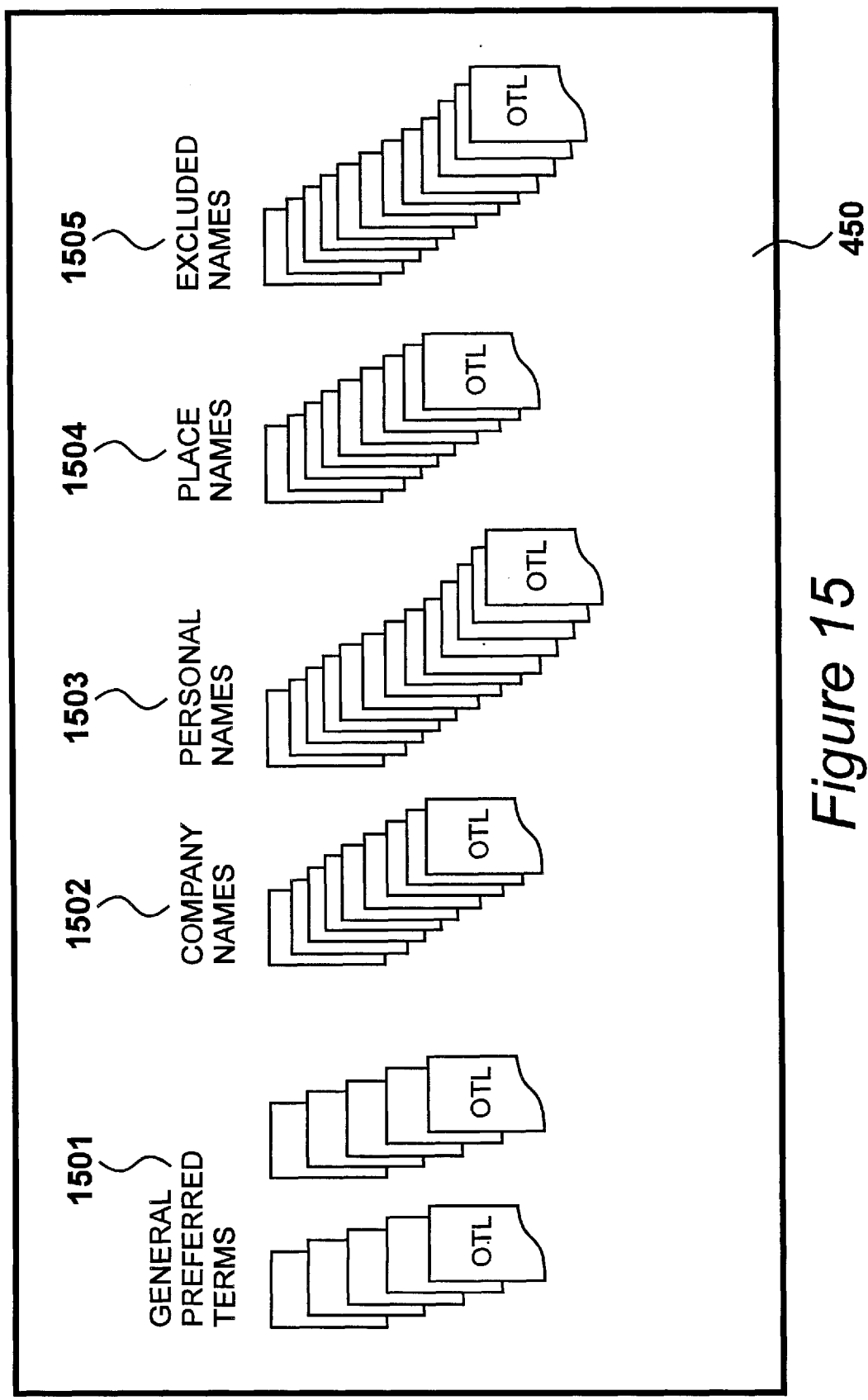
FIG. 15 shows a plurality of outline files for preferred terms and for non-preferred terms.

OTL files for the preferred contexts and OTL files for the non-preferred contexts are retained within storage 450 of processor 405 as illustrated in FIG. 15. Thus, storage 450 will include OTL files 1501 for general preferred terms, OTL files 1502 for company name contexts, defining the preferred category, OTL files for personal name contexts 1503, OTL files for place name contexts 1504 and OTL files for excluded name contexts 1505, wherein files 1503 to 1505 represent the non-preferred category.

Figure 16:
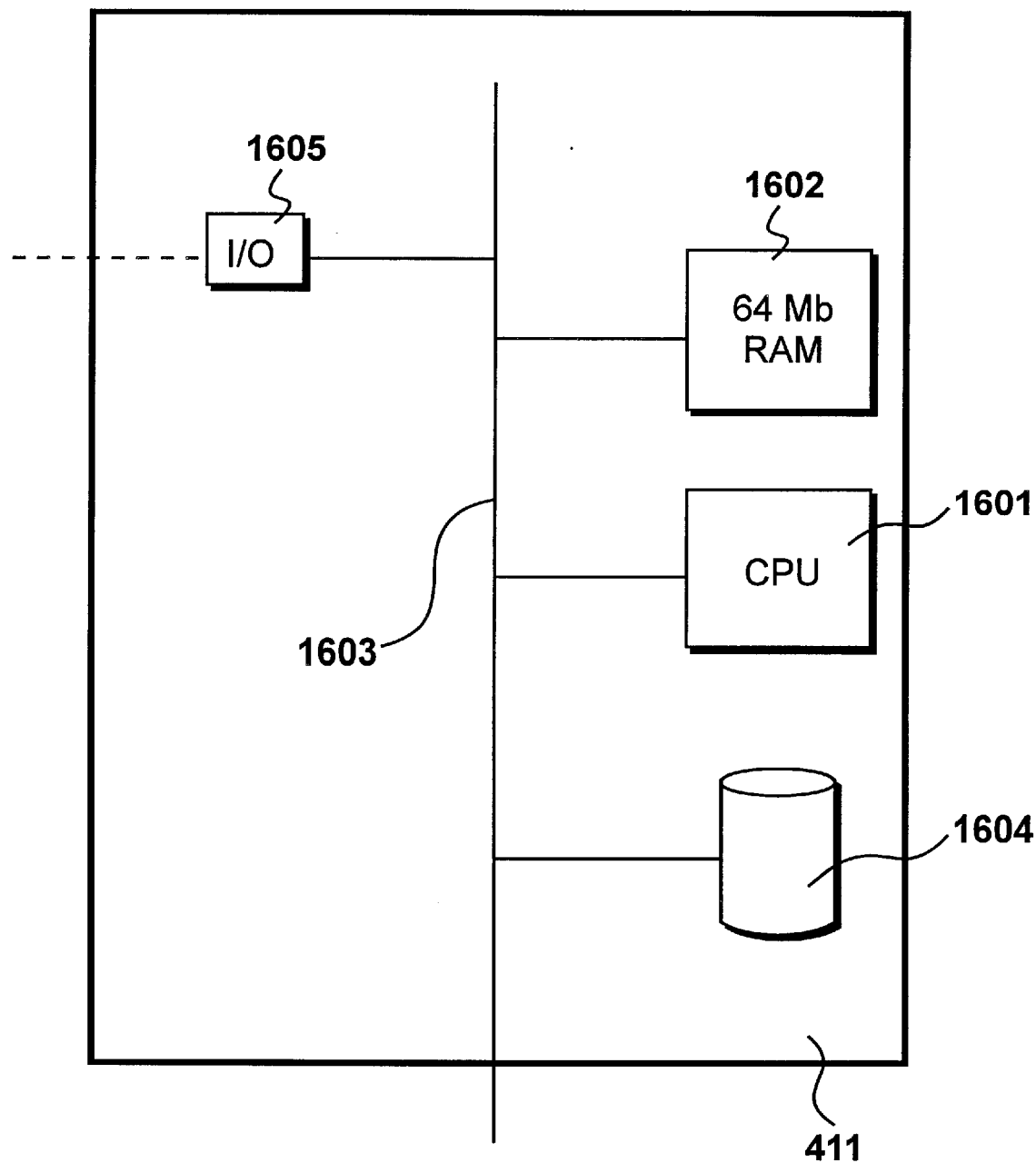
FIG. 16 details a subsidiary processor of the type shown in FIG. 4.

Subsidiary processor 411 is detailed in FIG. 16. The processor includes an Intel Pentium processing unit 1601 connected to sixty-four megabytes of randomly accessible memory 1602 via a PCI bus 1603. In addition, a local disk drive 1604 and an interface circuit 1605 are connected to bus 1603. Interface circuit 1605 communicates with the TCP/IP network.

Figure 17:
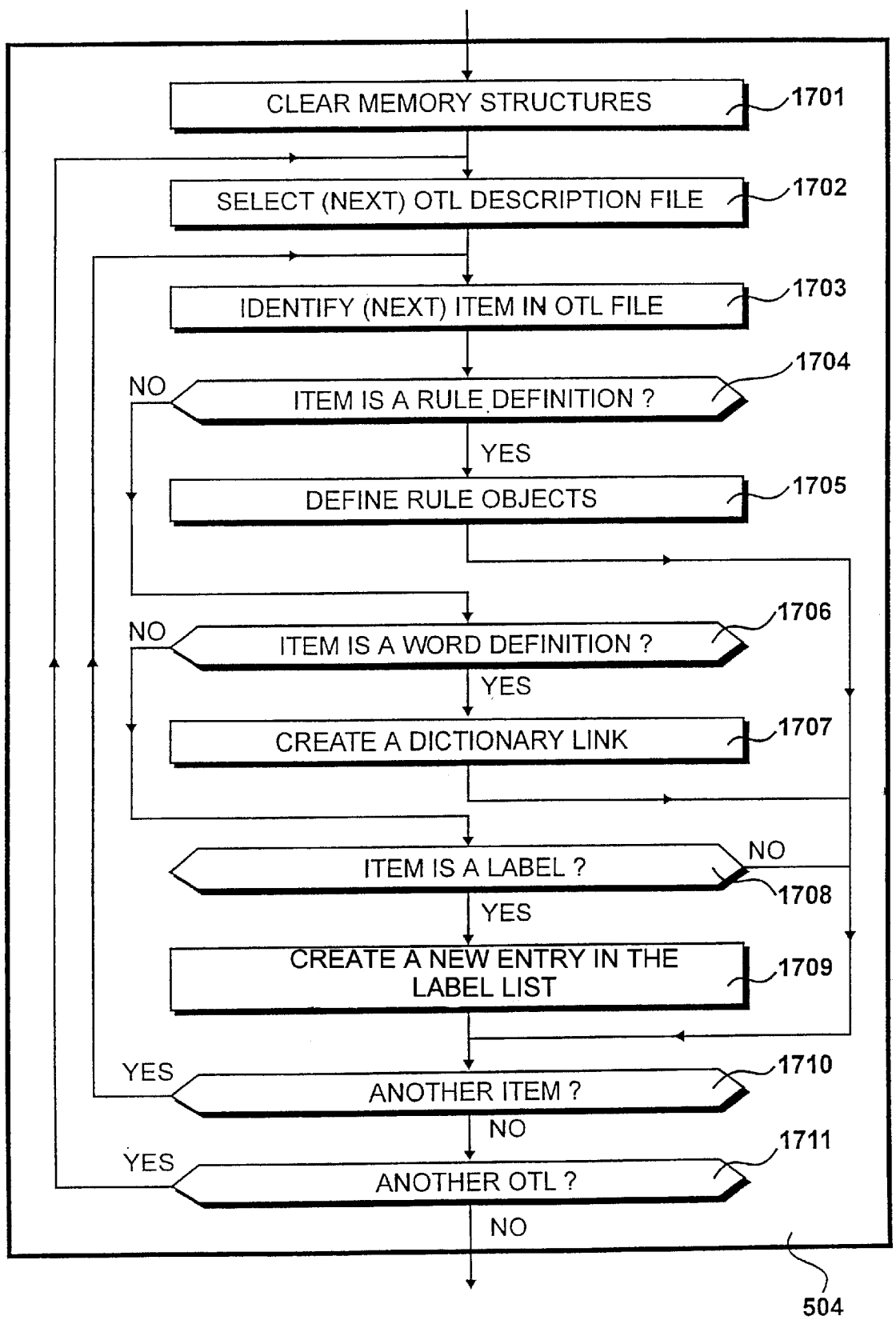
FIG. 17 details the process for initialising data structures identified in FIG. 5.

Random access memory 1602 stores instructions executable by the processing unit 1601, in addition to storing input data files received from the data sources 101 to 103 and intermediate data. Procedures 504 for the initialising of data structures by the parsing of outline files are detailed in FIG. 17.

At step 1701 temporary memory structures are cleared and at step 1702 an OTL description file is selected. At step 1703 an item in the OTL file is identified and at step 1704 a question is asked as to whether the item selected at step 1703 is a rule definition. If this question is answered in the affirmative, a rule object is defined at step 1705. Alternatively, if the question asked at step 1704 is answered in the negative, to the effect that the item is not a rule definition, a question is asked at step 1706 as to whether the item is a word definition. If this question is answered in the affirmative, a dictionary link is created at step 1707.

At step 1708 a question is asked as to whether the item is a label and when answered in the affirmative a new entry is created in a label list, whereafter at step 1710 a question is asked as to whether another item is present. After executing step 1705 or after executing step 1707, control is directed to step 1710.

When a question asked at step 1710 is answered in the affirmative, to the effect that another item is present, control is returned to step 1703 and the next item is identified in the OTL file.

Eventually, all of the items will have been identified resulting in the question asked at step 1710 being answered in the negative. Thereafter, at step 1711 a question is asked as to whether another OTL file is present and when answered in the affirmative control is returned to step 1702 allowing the next OTL description file to be selected. Thus, this process continues until all of the OTL files have been considered resulting in the question asked at step 1711 being answered in the negative.

Figure 18:
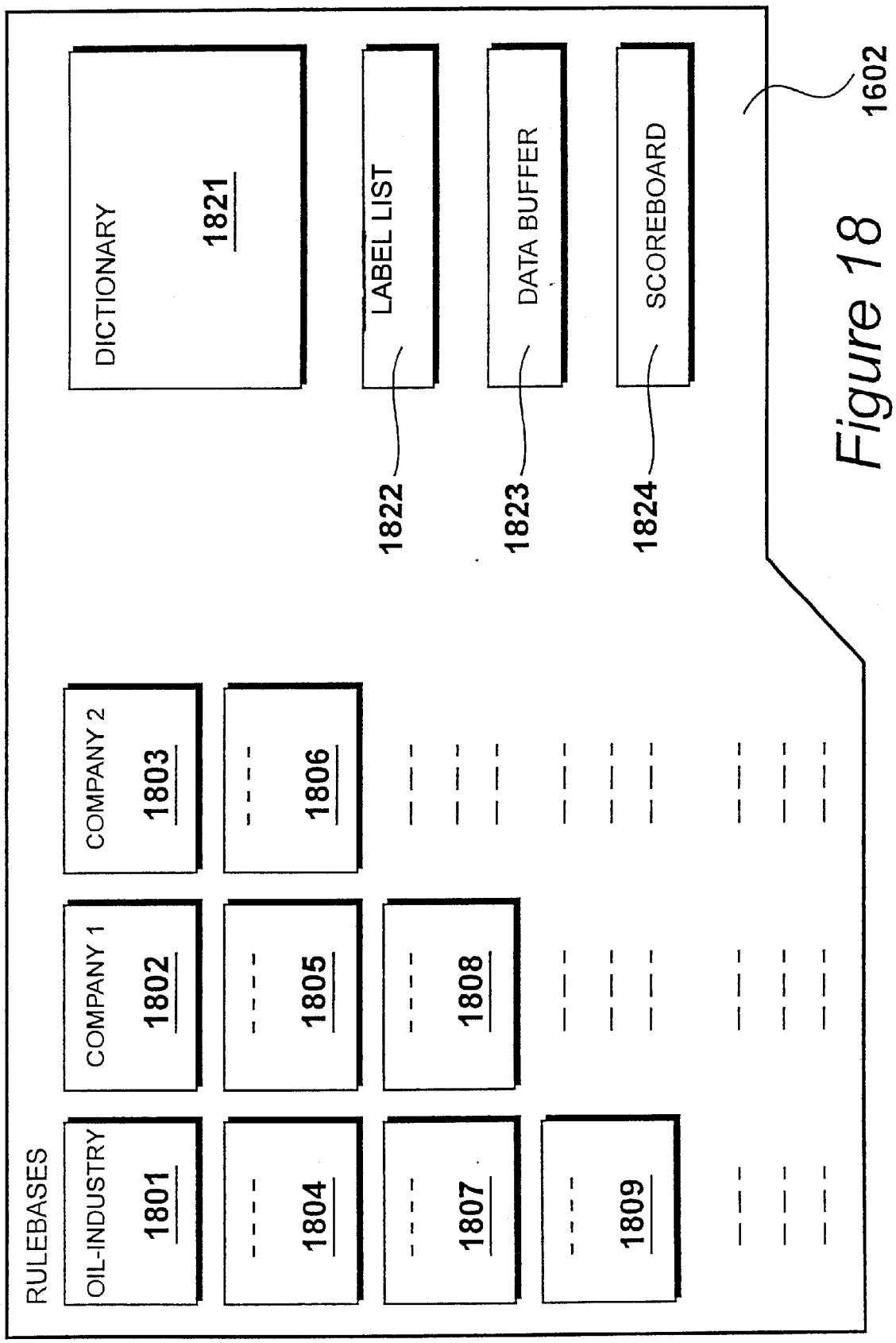
FIG. 18 illustrates outline files stored in a memory device identified in FIG. 16.

For each OTL file considered, by being selected at step 1702, a rule base is generated and a plurality of such rule bases is illustrated in FIG. 18. Thus, a first OTL file processed in accordance with the procedures shown in FIG. 17 results in the generation of a first rule base 1801. Similarly, further iterations result in the generation of rule bases 1802 to 1809. Typically, for a specific installation, in the order of three thousand rule bases would be generated by execution of the procedures illustrated in FIG. 17.

Rule bases 1801 to 1809 are stored in memory 1602, which also provides storage space for a dictionary 1821, a label list 1822 and a data buffer 1823. The dictionary stores a list of words which have importance in any of the stored rule bases. Associated with each word in the dictionary, there is at least one pointer and possibly many pointers, to specific entries in specific rule bases 1801 to 1809. Entries within the dictionary 1821 are implemented upon execution of step 1707 in FIG. 17. Similarly, execution of step 1709, creating a new entry in the label list, allows a label to relate to rules that are elsewhere in the tree structure.

Figure 19:
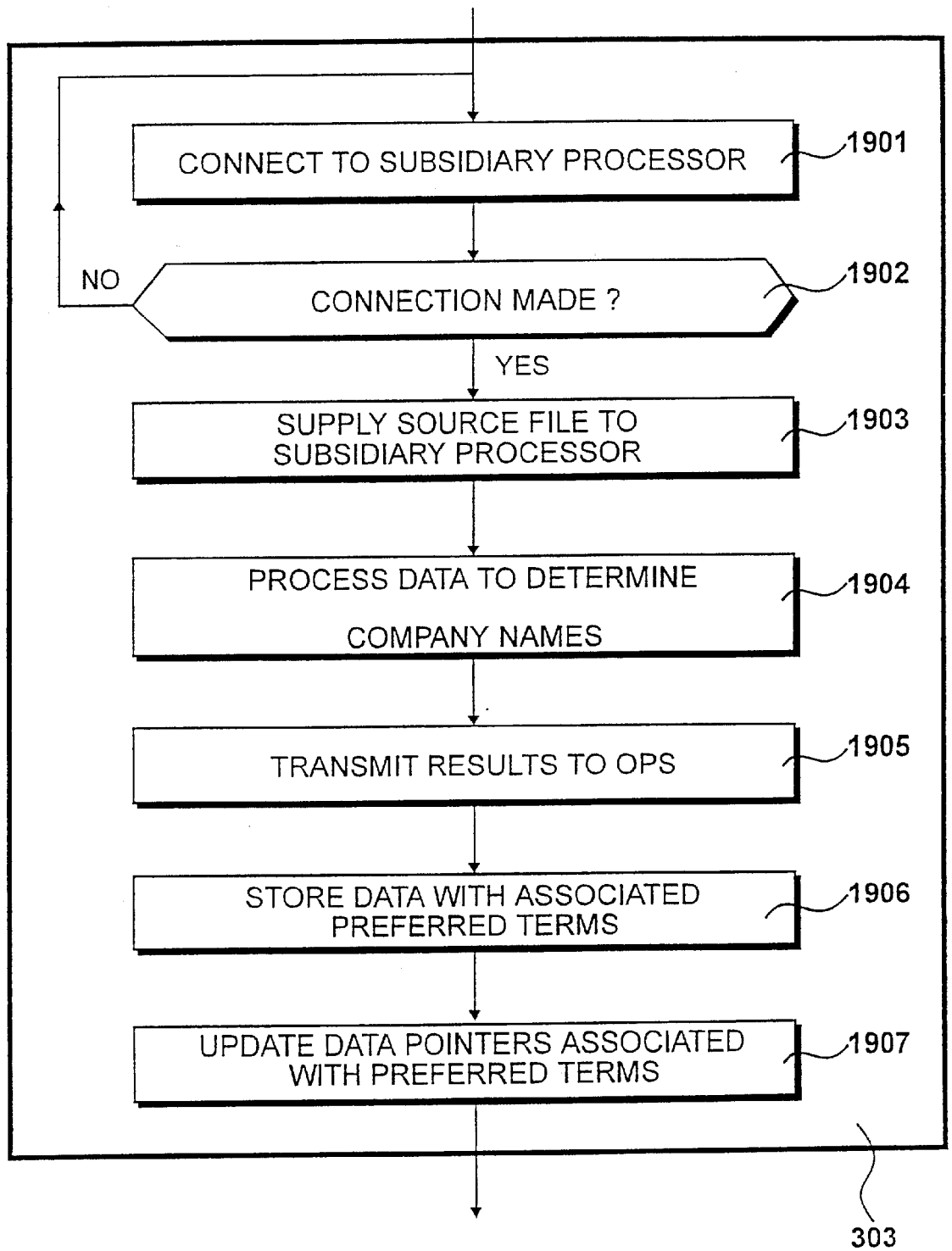
FIG. 19 details procedures for associating preferred terms with source files identified in FIG. 3.

The procedure for associating preferred terms with source files is detailed in FIG. 19. At step 1901, the central processor obtains access to one of the subsidiary processors. The central processor then expects to receive authorisation so that communication may be effected with one of the subsidiary processors. After a connection has been established, the source file is supplied to the selected subsidiary processor at step 1903 and at step 1904 the data is processed to determine associated preferred terms.

After performing the processing at step 1904, the results are transmitted back to the central processing system at step 1905. and at step 1906 data with associated preferred terms is stored and data pointers associated with the preferred data terms are updated at step 1907.

Figure 20:
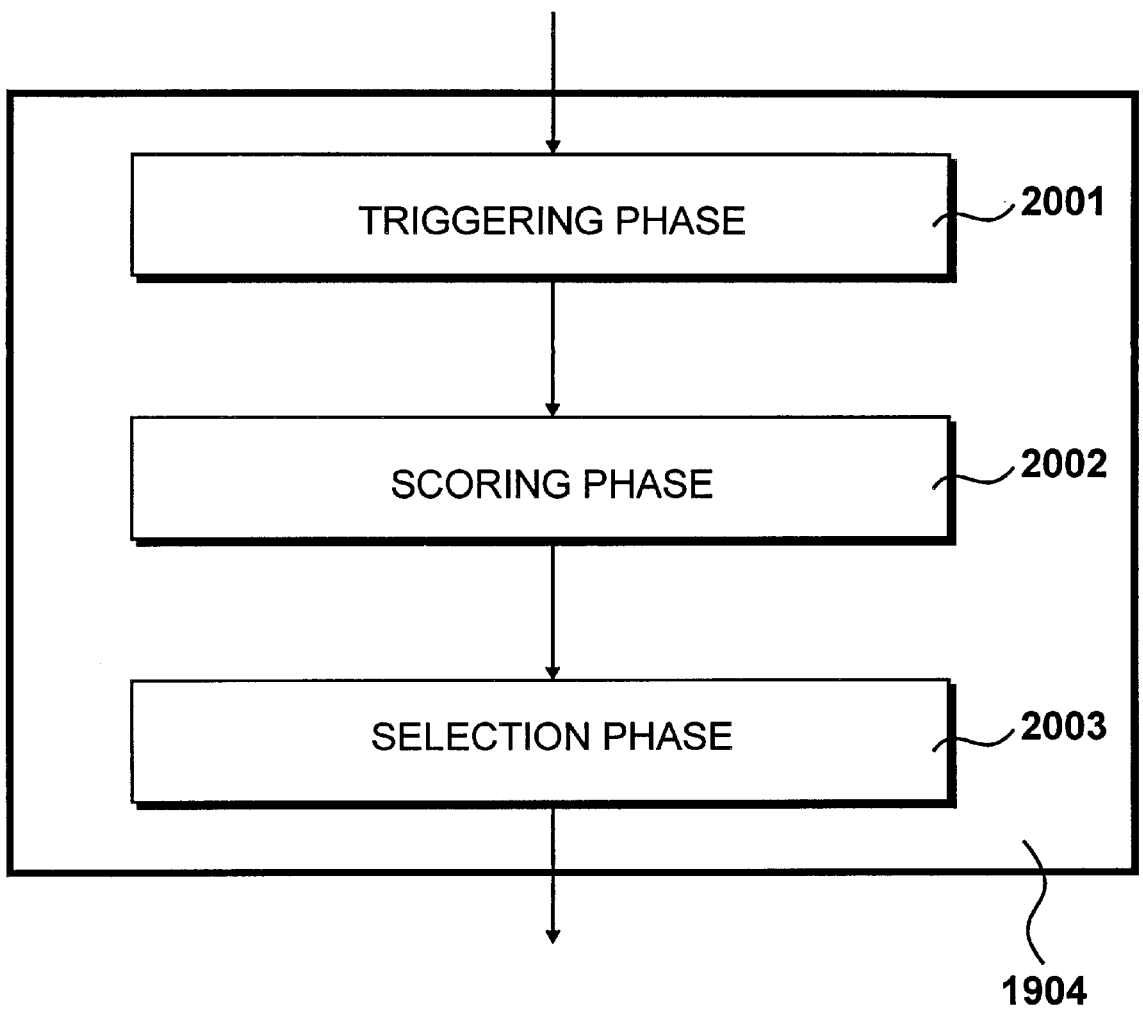
FIG. 20 details the processing of data to determine associated preferred terms identified in FIG. 19.

Step 1904 for the processing of data to determine associated preferred terms is detailed in FIG. 20. The overall processing is broken down into three major phases, consisting of a triggering phase at 2001, followed by a scoring phase at 2002 followed finally by a list generation phase at step 2003.

Figure 21:
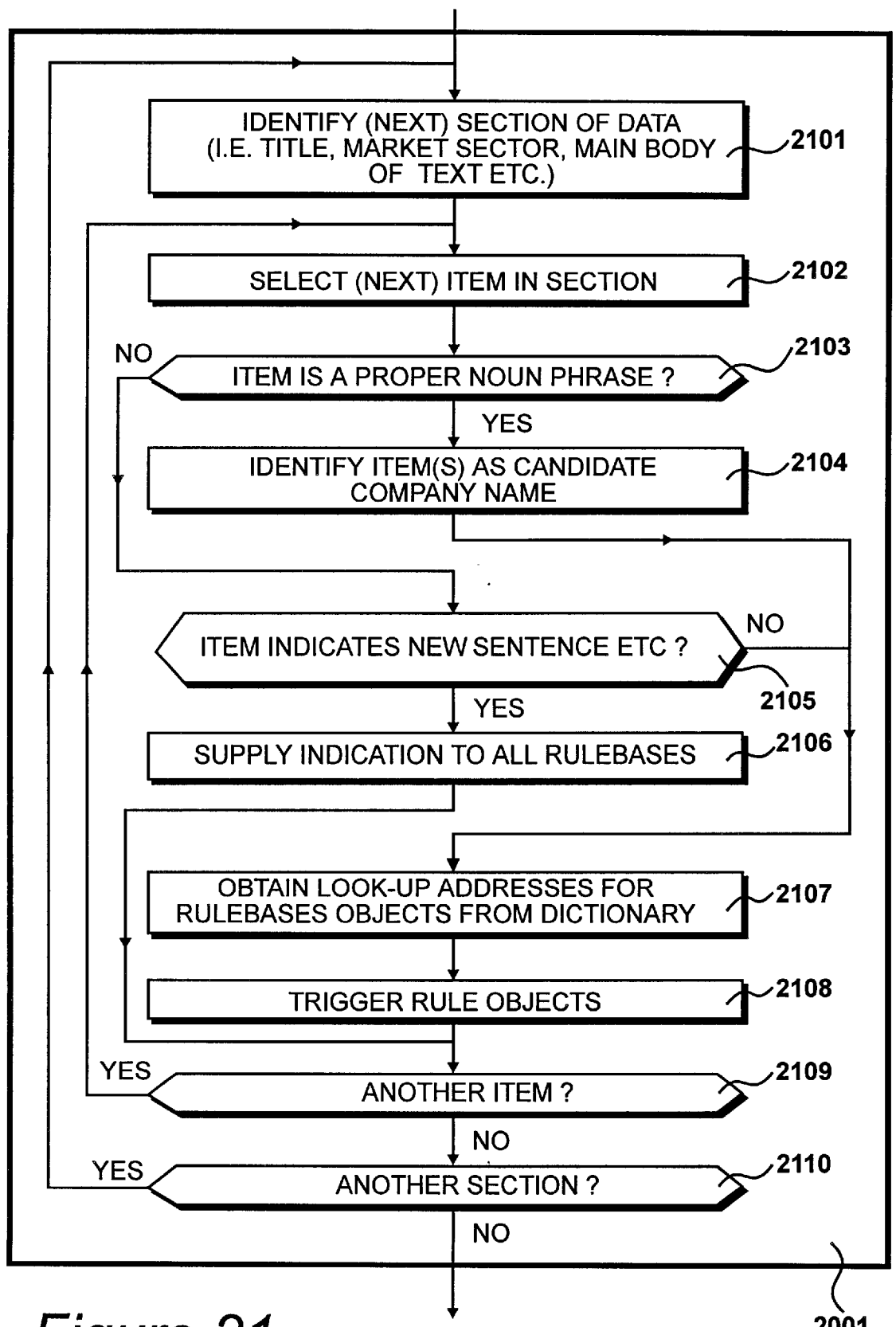
FIG. 21 details a triggering phase identified in FIG. 20.

Triggering phase 2001 is detailed in FIG. 21. At step 2101 the data section is identified, usually taking the form of a title, a market sector or a main body text. At step 2102 an item within the section identified at step 2101 is selected and at step 2103 a question is asked as to whether the item would be appropriate to any of the specified categories. In this particular example, such an identification is effected at step 2103 by asking a question as to whether the item is a proper noun phrase, determined by applying the file to a speech tagger The returned noun phrases are then considered to determine whether they include capital letters, thereby identifying them as proper noun phrases.

At step 2104 items selected at step 2102 are identified as candidates and control is directed to step 2107 where addresses are obtained for rule base objects by performing a look-up operation against a dictionary.

If the question asked at step 2103 is answered in the negative, to the effect that the item is not a proper noun phrase, control is directed to step 2105 where a question is asked as to whether the item represents a new sentence etc. If this question is answered in the affirmative, the indication is supplied to all rule bases. Alternatively, if this question is answered in the negative, look-up addresses are obtained at step 2107.

At step 2108 rule objects are triggered and at step 2109 a question is asked as to whether another item is to be considered. When answered in the affirmative, control is returned to step 2102 and the next item is selected. Eventually, all of the items will have been considered and the question asked at step 2109 is answered in the negative. At step 2110 a question is asked as to whether another section is to be considered and when answered in the affirmative control is returned to step 2101. Eventually, all of the sections will have been considered and the question asked at step 2110 will be answered in the negative.

Process 2107 for obtaining look-up address for rule base objects from the dictionary receives indications of words, noun phrase and punctuation, such that an appropriate change of context may be indicated to all rule bases that are instantiated in memory 1602, shown in FIG. 18.

Candidates identified at step 2104, when supplied to step 2107, result in object addresses being generated which triggers the leaf nodes of rules; such as candidate node 1109 shown in FIG. 11.

Figure 22:
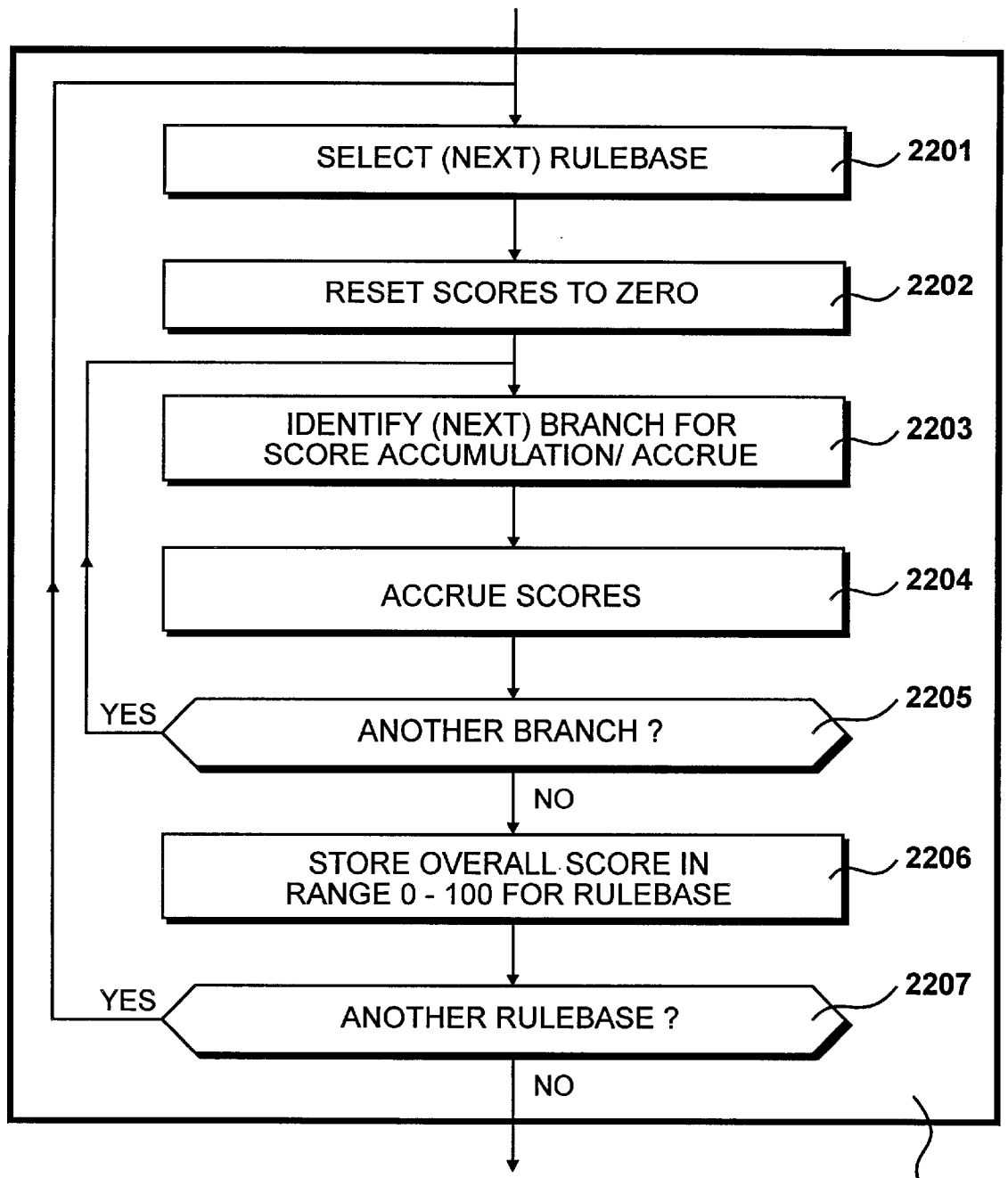
FIG. 22 details a scoring phase identified in FIG. 20.

The scoring phase is detailed in FIG. 22. At step 2201 a rule base is selected and at step 2202 a score variable is re-set to zero. At step 2203 a branch is identified for score accumulation/accrue and at step 2204 scores are accumulated or accrued from triggered rules attached to the branch. At step 2205 a question is asked as to whether another branch is to be considered and when answered in the affirmative control is returned to step 2203. A next branch is selected at step 2203 with procedure 2204 being repeated. Eventually all of the branches will have been considered resulting in the question asked at step 2205 being answered in the negative.

At step 2206 an overall score in the range of zero to one hundred is stored for the rule base and at step 2207 a question is asked as to whether another rule base is present. When answered in the affirmative control is returned to step 2201 and steps 2201 to 2207 are repeated. Eventually, all of the rule bases will have been considered and the question asked at step 2207 will be answered in the negative.

Figure 23:
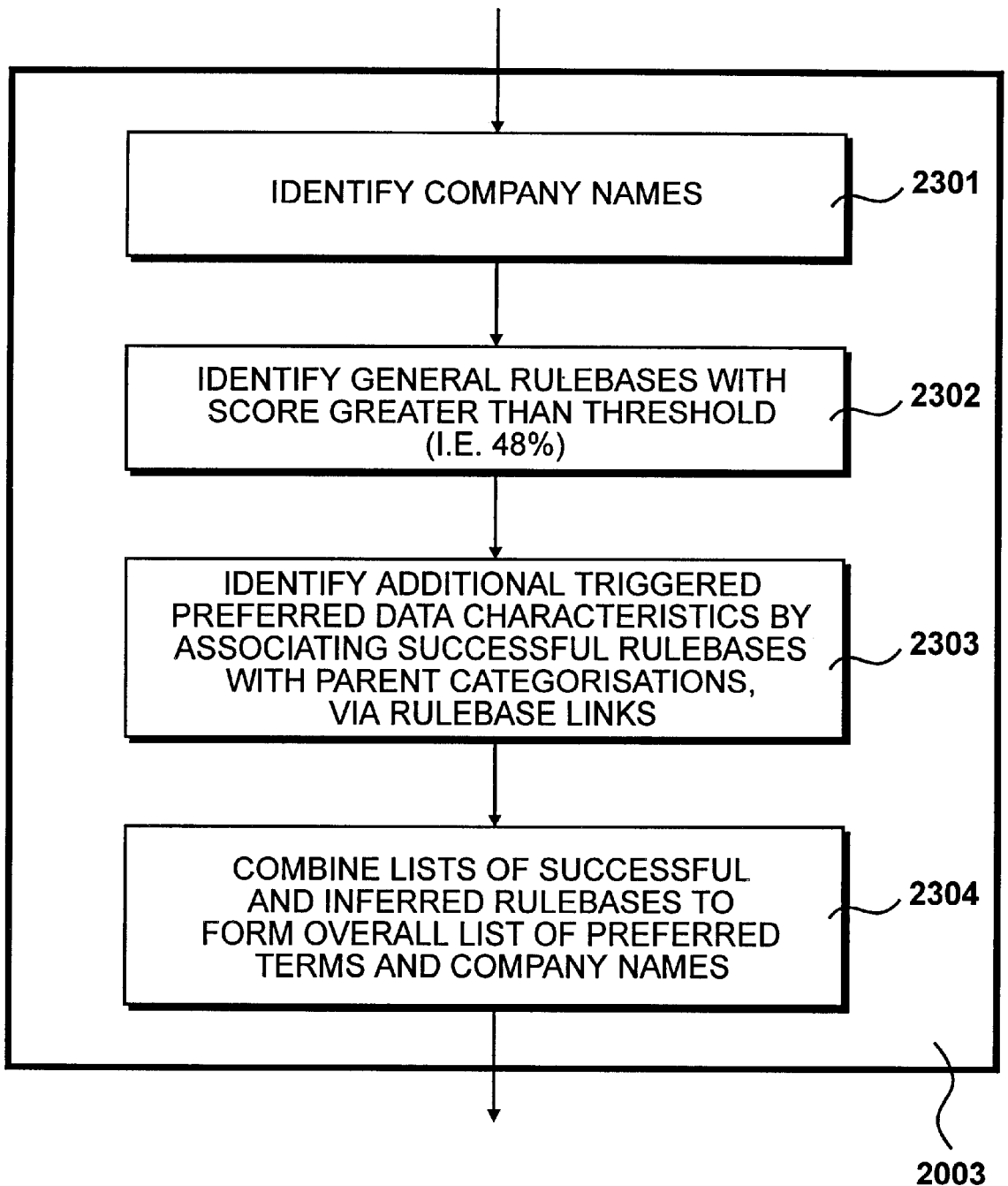
FIG. 23 details a phase for the generation of a list of associated preferred terms identified in FIG. 20.

The phase for the generation of a list of associated preferred terms is detailed in FIG. 23. At step 2301, company names are identified. At step 2302 a rule base is identified having a score greater than a predetermined threshold. Thus, for a particular application a threshold may be set at forty-eight percent. At step 2303 additional triggered preferred data characteristics are identified by associating successful rule bases with parent categorisations by rule base links.

At step 2304 lists of successful and inferred rule bases are combined to form overall lists of preferred data characteristics. Step 2304 results in data being generated by a subsidiary processor, such as processor 411, which is then supplied back to the central processing system 405.

Figure 24:
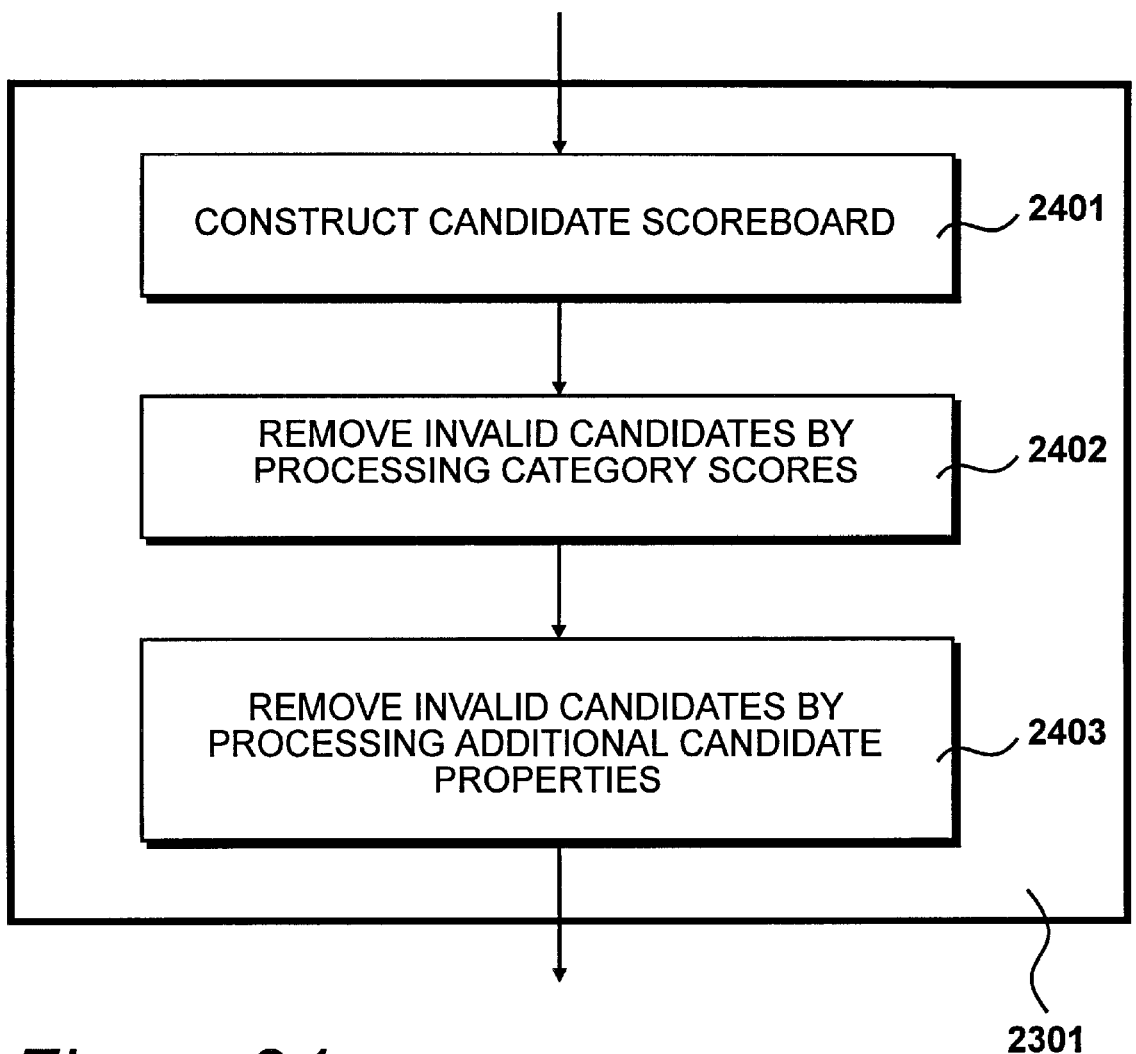
FIG. 24 details a procedure for identifying company names identified in FIG. 23.

Procedure 2301 for identifying company names is detailed in FIG. 24. At step 2401 a candidate scoreboard is constructed and at step 2402 invalid candidates are removed by processing category scores. At step 2403 invalid candidates are removed by processing additional candidate properties.

An example of a candidate scoreboard constructed at step 2401 is illustrated in FIG. 25. Candidates, in the form of potential company names in this example, are identified at step 2301 and included in column 2501 of the table shown in FIG. 25. Each candidate placed in column 2501 is scored in accordance with the rules defined in FIGS. 11, 12 and 14. In this example, company name column 2502 represents the preferred category, with a personal name column 2503, a place name column 2504 and an excluded column 2505 being non-preferred categories.

As shown in the example, the candidate "Last Christmas" has been identified but this has only scored in the excluded category with, understandably, zero scores being placed under categories 2502, 2503 and 2504.

Figure 26:
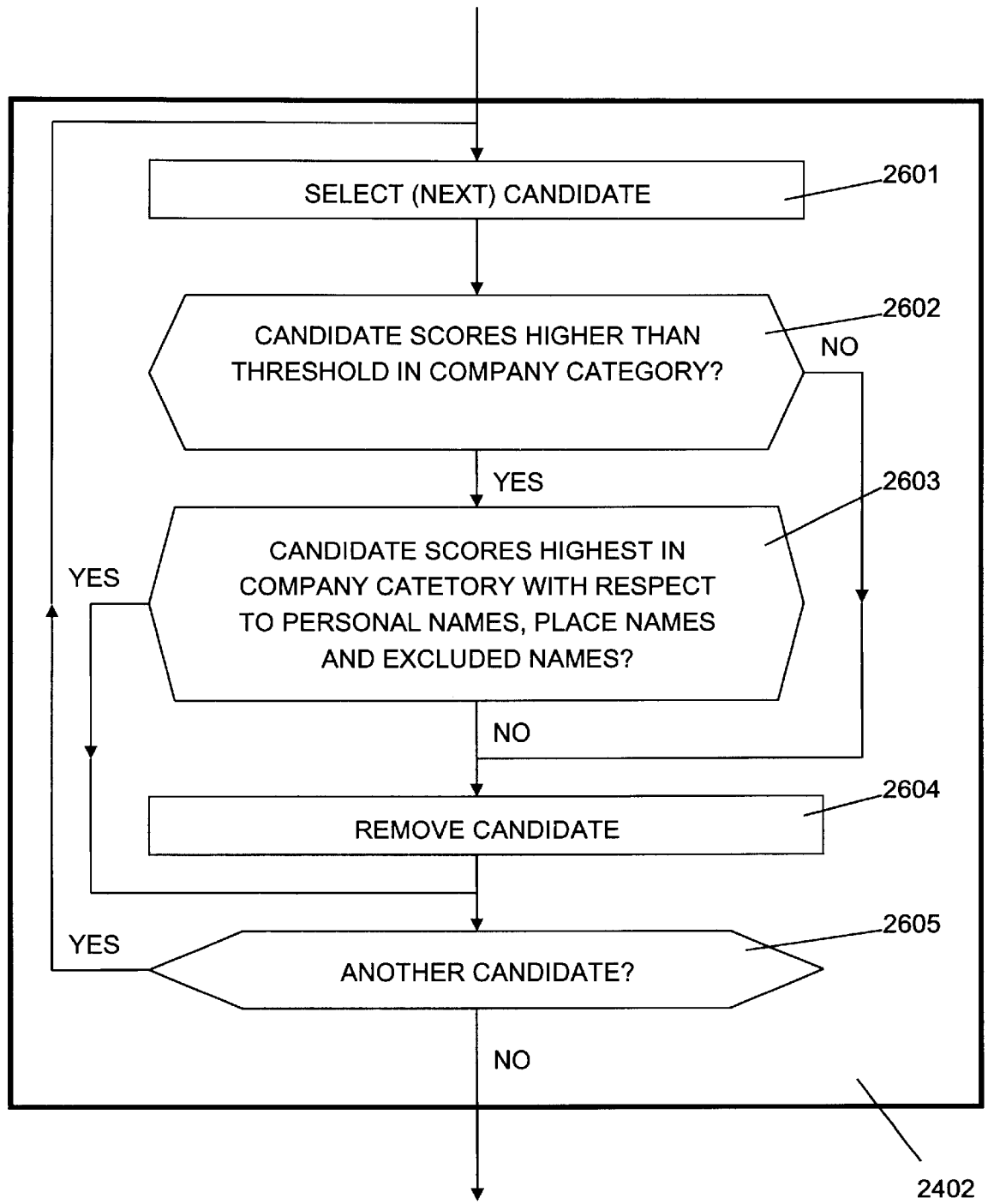
FIG. 26 shows a process for removing invalid characters identified in FIG. 24.

Process 2402 for removing invalid candidates by processing category scores, as recorded in the scoreboard shown in FIG. 25, is detailed in FIG. 26. At step 2601 a candidate is selected and at step 2602 a question is asked as to whether the candidate score in the preferred category, ie the company category, is higher than a predetermined threshold. If this question is answered in the affirmative, a question is asked as to whether the candidate's score in the company category is the highest of all the categories, that is to say, whether the score in company column 2502 represents the highest score and is higher than the personal name category, the place name category, or the excluded category.

If the question asked at step 2603 is answered in the negative, to the effect that the candidate score in the preferred category is not the highest, the item is removed from the candidate list at step 2604. Alternatively, if the question asked at step 2603 is answered in the affirmative, to the effect that the preferred entry represents the highest entry, step 2604 is bypassed and a question is asked at step 2605 as to whether another candidate is to be processed. If another candidate requires processing, the question asked at step 2605 is answered in the affirmative and control is returned to step 2601, where the next candidate is selected. Eventually, the question asked at step 2605 will be answered in the negative.

Experimental evidence suggests that a value of 0.3 represents a good compromise for establishing a threshold. However, this value may be adjusted as considered appropriate.

The result of performing the process shown in FIG. 26 is that the number of entries in the candidate list is reduced. Thus, the candidate list shown in FIG. 25, following the procedures shown in FIG. 26, results in a reduced list as shown in FIG. 27.

The process shown in FIG. 26 has successfully removed entries that are clearly not companies. However, a problem still persists, as shown in FIG. 27, in that many company names are made up of word combinations while, at the same time, many references to companies are made in combination with other companies. In the example shown, "Marks & Spencer" is valid but the entries for "Marks" and "Spencer" separately are not valid. The entries for "Glaxo" and "Beecham" are valid but the entry for "Glaxo & Beecham" is not valid.

Figure 28:
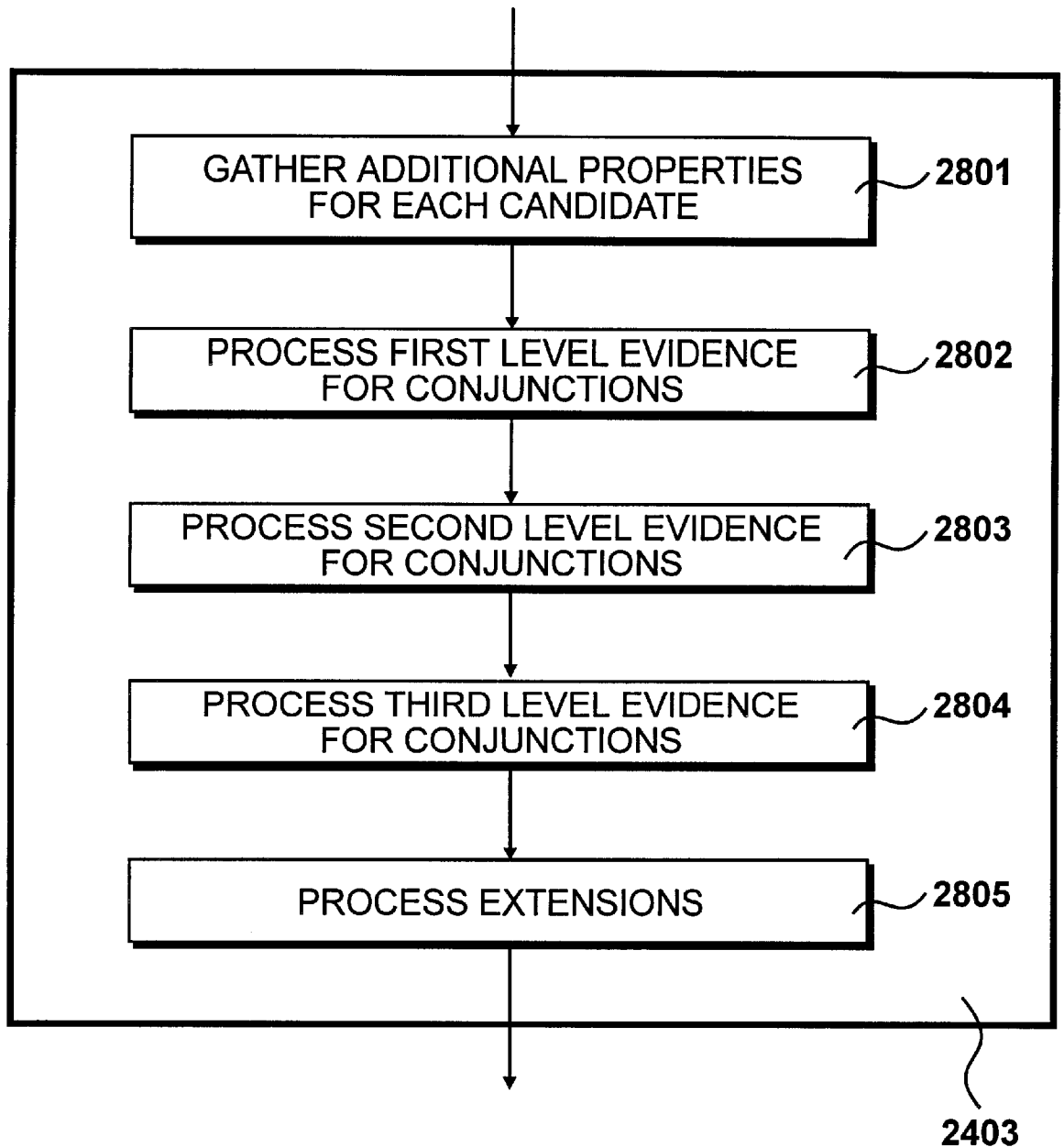
FIG. 28 details a process for the removal of invalid candidates identified in FIG. 24.

Process 2403 for the removal of invalid candidates is detailed in FIG. 28. At step 2801 additional properties are gathered for each candidate still present on the list, as shown in FIG. 27. At step 2802 first level evidence is processed for conjunctions to determine whether the conjunction is valid or the individual words are valid.

At step 2803 a second level process for conjunctions is performed and this is followed at step 2804 by a third level process for conjunctions.

At step 2805 extensions are processed, thereby completing process 2403.

Figure 29:
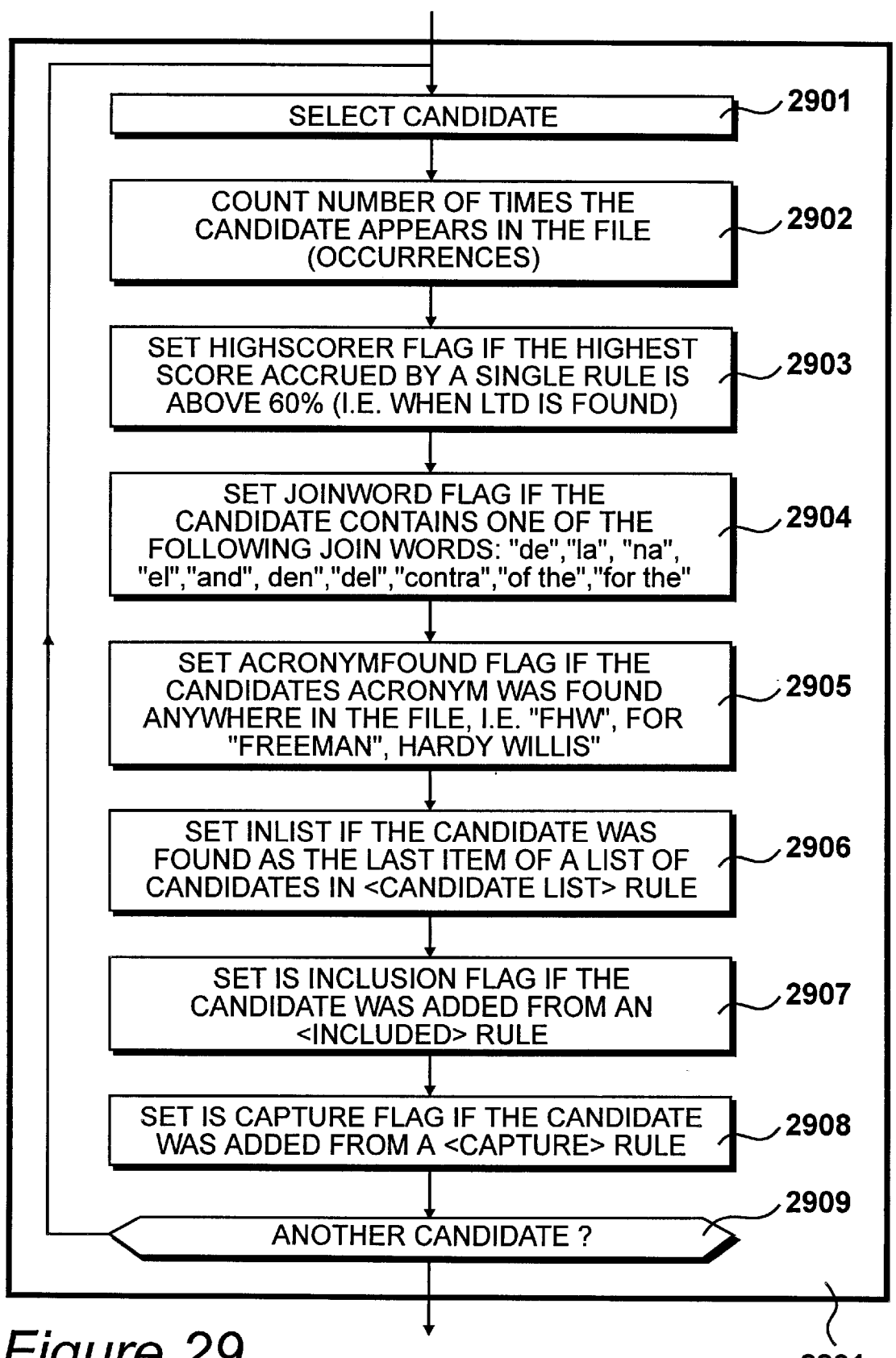
FIG. 29 shows a process for the gathering of additional properties identified in FIG. 28.

Process 2801 for the gathering of additional properties for each candidate is detailed in FIG. 29. At step 2901 a candidate is selected and at step 2902 a number of occurrences of the candidate in the file under consideration is counted. At step 2903 a high scorer flag is set if the highest score accrued by a single rule is above sixty per cent.

At step 2904 a join_word flag is set if the candidate contains one of a specified joining word. In this example, joining words "de", "la", "na", "I" "and" "den", "del", "contra", "of the", "for the" are specified.

At step 2905 an acronym_found flag is set if the candidate's acronym was found anywhere in the file. Thus, the file may include "Freeman, Hardy Willis" and its acronym "FHW".

At step 2906 an "in list" flag is set if the candidate was found as the last item of a list of candidates in a candidate list rule.

At step 2907 an "is_inclusion" flag is set if the candidate was added from an include rule.

At step 2908 an "is_capture" flag is set if the candidate was added from a capture rule.

Thereafter, at step 2909 a question is asked as to whether another candidate is to be considered and when answered in the affirmative control is returned to step 2901.

Figure 30:
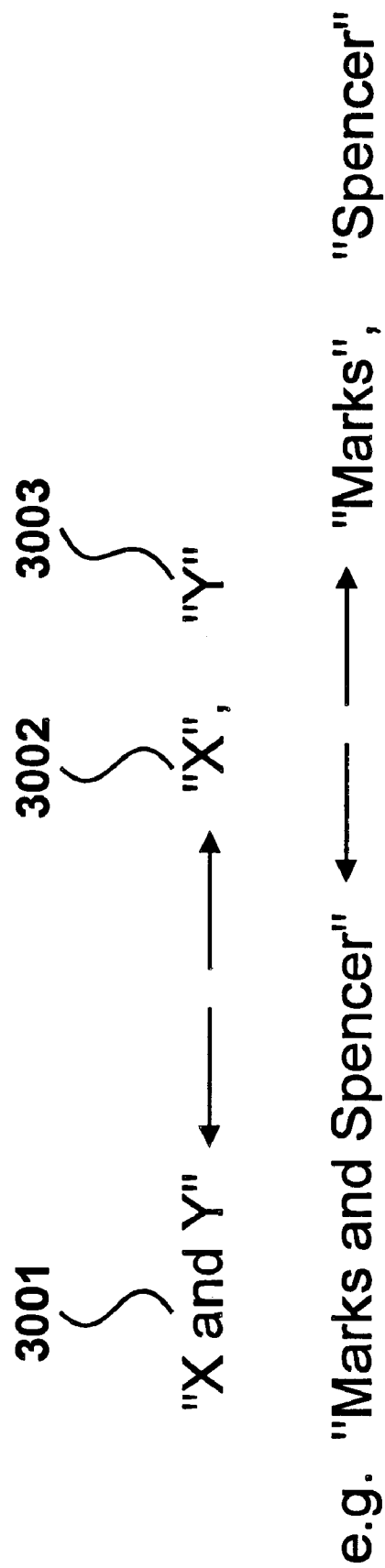
FIG. 30 identifies relationships between entries of the type shown in FIG. 27.

Relationships between entries of the type shown in FIG. 27 are shown in FIG. 30. Candidates have been identified in which two or more separate items have been placed in the candidate list which also contains these items as a single item in combination. Thus, combination 3001 consists of "X and Y". This combination consists of the individual contributions "X" at 3002 along with "Y" at 3003. This presents a total of three candidates. However, if the entry at 3001 is being considered as a candidate, 3002 and 3003 may be considered as children of this candidate. Similarly, if the entries at 3002 and 3003 are being considered as candidates, the entry at 3001 may be considered as the parent of these candidates.

Figure 31:
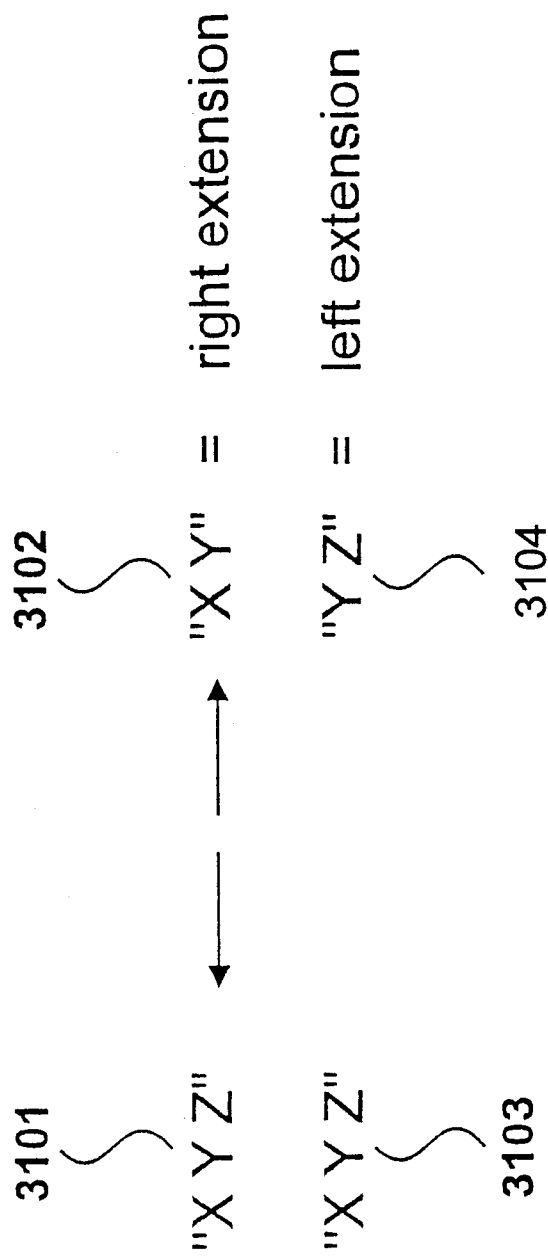
FIG. 31 shows further relationships between entries of the type shown in FIG. 27.

Other multiple entries exist in which one candidate may be derived from another candidate; by having a more general type extension added thereto; either to the right or to the left. In FIG. 31, a candidate "XYZ" is shown at 3101 and another candidate "XY" is shown at 3102. Here it can be seen that candidate 3101 is equivalent to candidate 3102 with a right extension.

A candidate "XYZ" is shown at 3103, along with candidate "YZ" at 3104. On this occasion, candidate 3103 is equivalent to candidate 3104 with a left extension.

An example of a left extension candidate is shown in that the procedures may have identified, for example, "Building Design Partnership" and "Building Design". Clearly the word "partnership" is a right extension.

Figure 32:
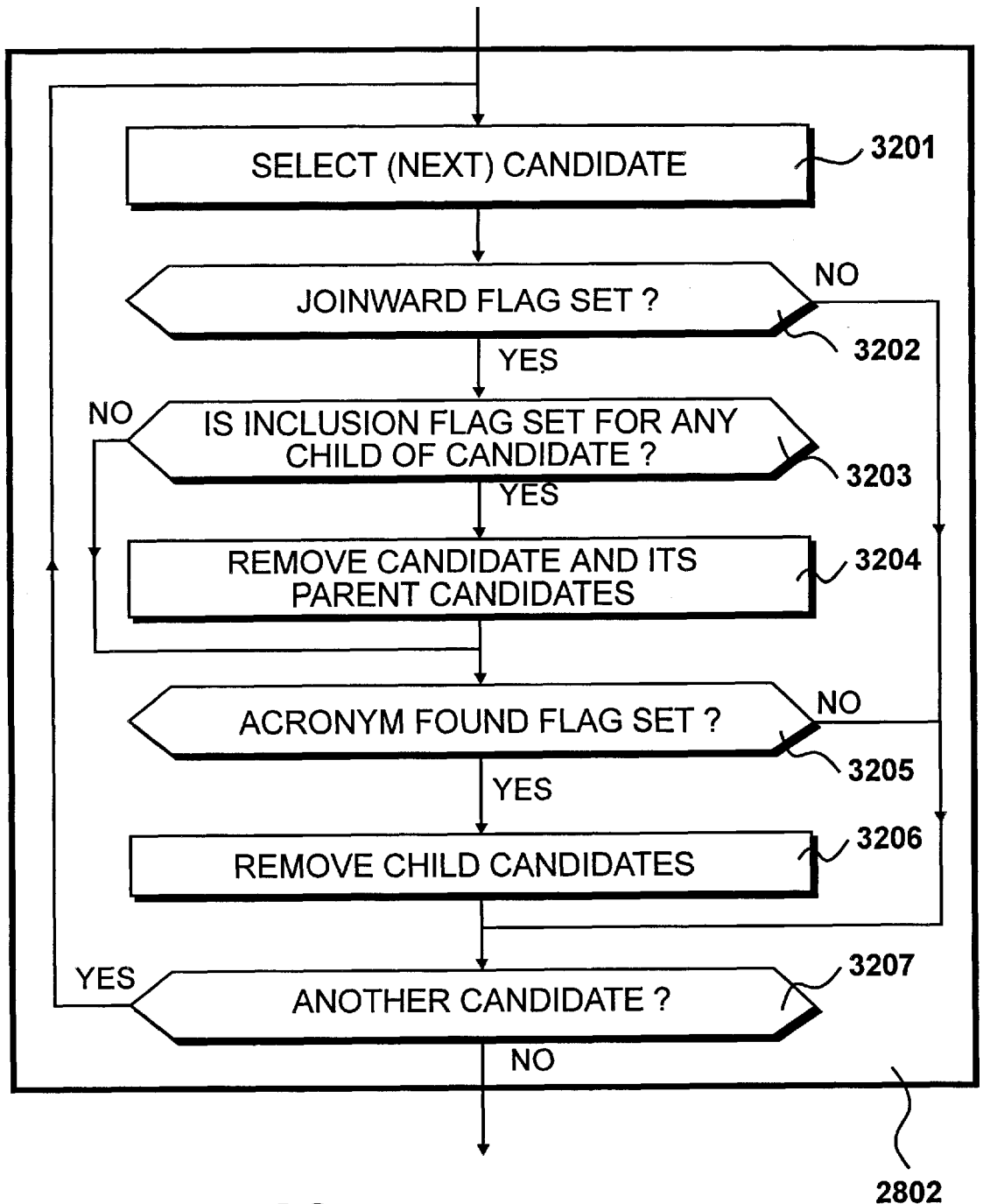
FIG. 32 details a first level process identified in FIG. 28.

First level process 2802 is detailed in FIG. 32. At step 3201 a candidate is selected and at step 3202 a question is asked as to whether the join_word flag has been set. When answered in the affirmative, a question is asked at step 3203 as to whether the is_inclusion flag has been set for any child of the candidate selected at step 3201. If this question is answered in the affirmative, the candidate and its parent candidates are removed at step 3204. Thus, the child is kept in preference to the parent.

Thereafter, at step 3205 a question is asked as to whether the acronym_found flag has been set and if answered in the affirmative, child candidates are removed at step 3206. Thereafter, a question is asked at step 3207 as to whether other candidates are present and when answered in the affirmative control is returned to step 3201 for the next candidate to be selected.

If the question asked at step 3203 is answered in the negative, to the effect that the is_inclusion flag has not been set, control is directed to step 3205. If the question asked at step 3205 is answered in the negative, to the effect that the acronym_found flag has not been set, control is directed to step 3207.

Figure 33:
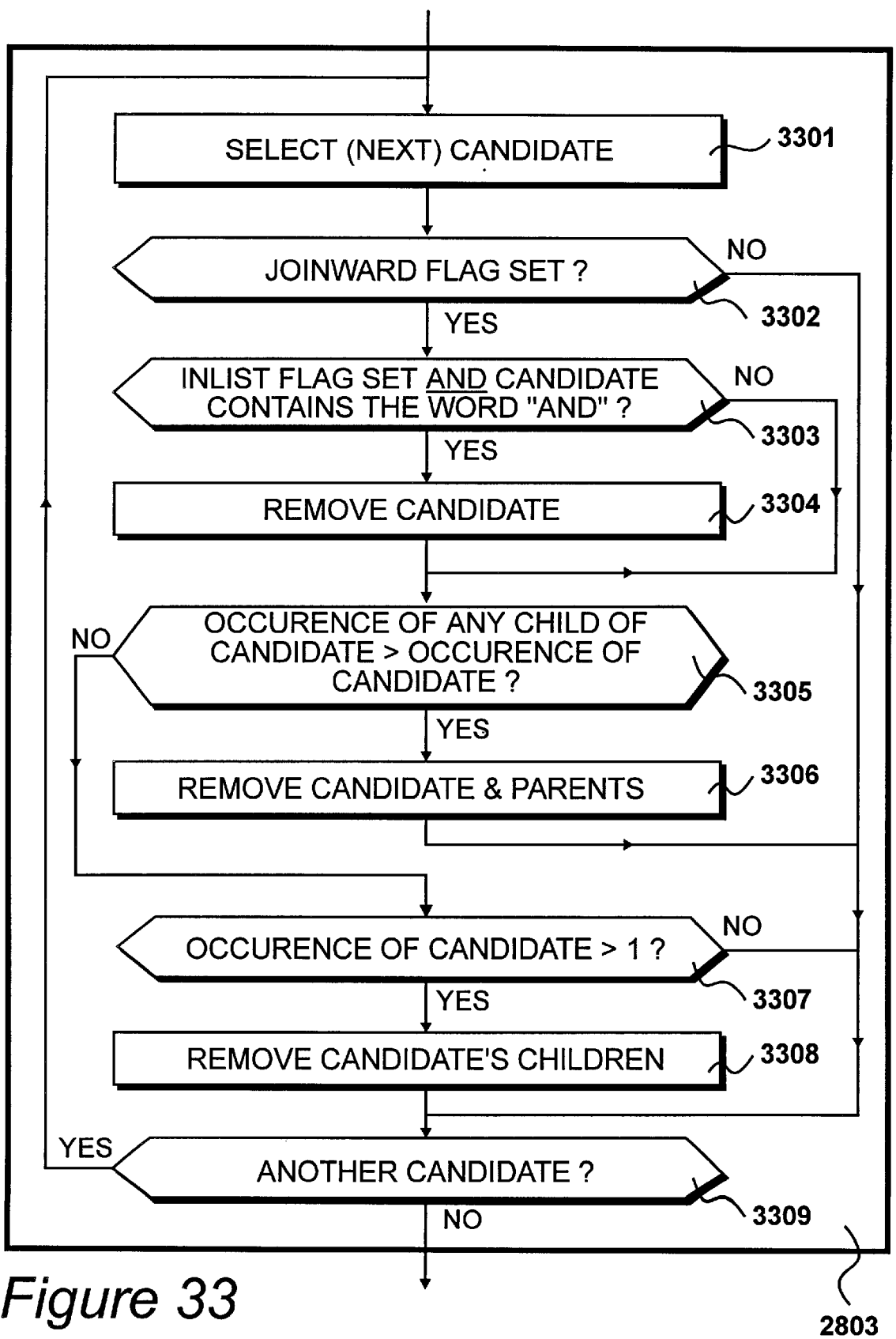
FIG. 33 details a second level process identified in FIG. 28.

Second level process 2803 is detailed in FIG. 33. At step 3301 a candidate is selected and at step 3302 a question is asked as to whether the join_word flag has been set. If this question is answered in the affirmative, a question is asked at step 3303 as to whether the in_list flag has been set and the candidate contains the word "and". If this question is answered in the affirmative the candidate is removed at step 3304.

If the question asked at step 3303 is answered in the negative, control is directed to step 3305, where a question is asked as to whether the number of occurrences for any child candidate is greater than the number of occurrences for the candidate itself. If this question is answered in the affirmative, the candidate and its parents are removed at step 3306, thereby retaining the child.

If the question asked at step 3305 is answered in the negative, control is directed to step 3307 where a question is asked as to whether the number of occurrences of the candidate is greater than one. If this question is answered in the affirmative, the candidate's children are removed at step 3308. Thereafter, at step 3309 a question is asked to whether any further candidates are to be considered and control is returned to step 3301, for the next candidate to be selected, if the question is answered in the affirmative.

Figure 34:
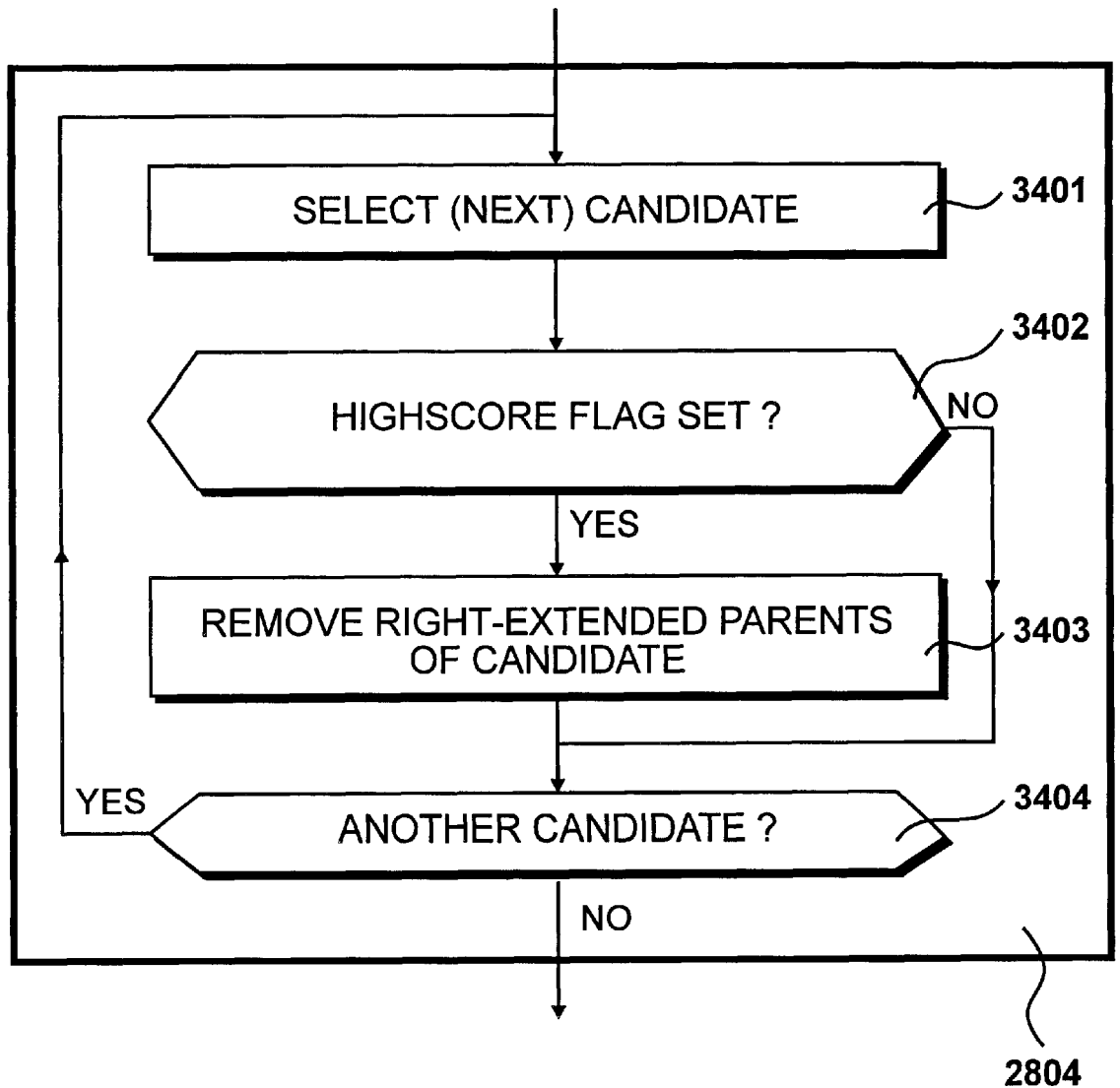
FIG. 34 details a third level process identified in FIG. 28.

Third level processing step 2804 is detailed in FIG. 34. At step 3401 a candidate is selected and at step 3402 a question is asked as to whether the high_scorer flag has been set. When this question is answered in the affirmative, right extended parents of the candidate are removed at step 3403. Thereafter, a question is asked at step 3404 as to whether another candidate is present and when answered in the affirmative control is returned to step 3401. If the question asked at step 3402 is answered in the negative, to the effect that the high_scorer flag has not been set, step 3403 is bypassed and control is directed to step 3404.

Figure 35:
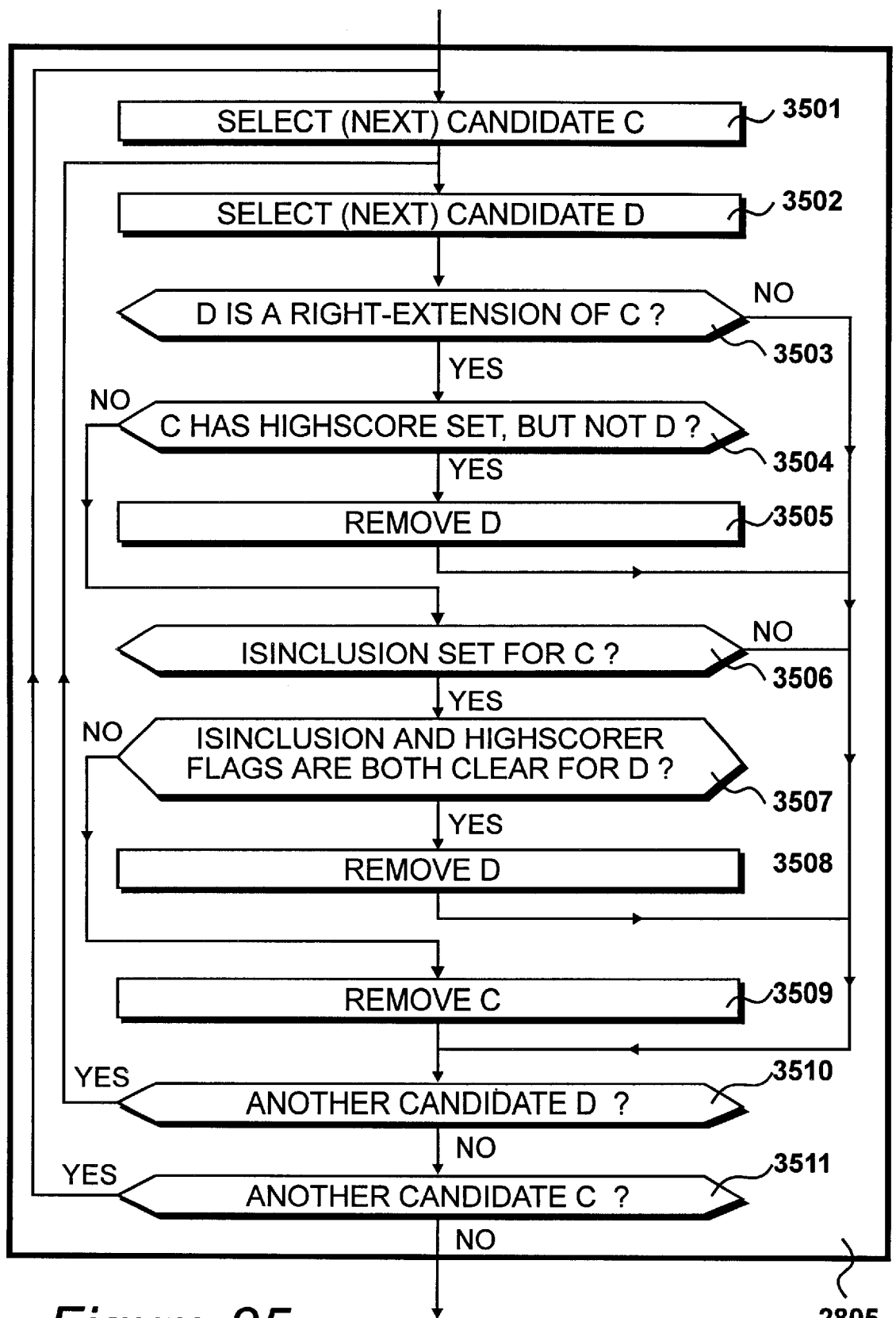
FIG. 35 details procedures for processing extensions identified in FIG. 28.

Procedures 2805 for the processing of extensions is detailed in FIG. 35. At step 3501 a first candidate is selected identified as candidate C. At step 3502 a second candidate is selected identified as candidate D. At step 3503 a question is asked as to whether D is a right extension of C. If this question is answered in the affirmative, a question is asked at step 3504 as to whether C has its high score flag set but not D. If this question is answered in the affirmative, to the effect that C does have its high score flag set but D does not, candidate D is removed at step 3505, whereafter control is directed to step 3510.

If the question asked at step 3504 is answered in the negative, to the effect that C does not have its high_scorer flag set or, alternatively, the high_scorer flag for C is set but said flag is also set for D, control is directed to step 3506 whereupon a question is asked as to whether the is_inclusion flag has been set for C. If this question is answered in the affirmative, a question is asked at step 3507 as to whether the is_inclusion flag and the high_scorer flag are both clear for D. If this question is answered in the affirmative, D is removed from the candidate list at step 3508 and control is directed to step 3510.

Alternatively, if the question asked at step 3507 is answered in the negative to the effect that both of the flags are not set, C is removed from the candidate list at step 3509.

At step 3510 a question is asked as to whether there is another candidate to be considered as a D candidate and when answered in the affirmative control is returned to step 3502. Thus, candidate C is retained and all of the remaining candidates are considered as a potential D candidate. After all of the candidates have been considered in this way, the question asked at step 3510 is answered in the negative and control is directed to step 3511.

At step 3511 a question is asked as to whether another C candidate is to be considered and when answered in the affirmative, control is returned to step 3501. Thereafter, a D candidate is selected at 3502. Thus, all available candidates are selected as a C candidate and for each C selection, all available candidates are considered as a D candidate.

After completing the procedures identified in FIG. 28, many, if not all, of the redundant candidates will have been removed. The results of processing the candidate table shown in FIG. 27 is illustrated in FIG. 36. Thus, following the procedures identified in FIG. 28, reference to "Marks & Spencer" has been retained correctly and references to "Glaxo" and "Beecham" have been retained correctly.

A preferred term table is shown in FIG. 37, having pointers to a linked list illustrated in FIG. 38. The preferred term "Thai Airways" has been associated to a pointer 0F8912. Address 0F8912 is the first in column 3702 and thus represents the first entry in the linked list shown in FIG. 8, illustrated by column 3801. Column 3802 identifies a particular file name and column 3803 identifies the next pointer in the list. Thus, entry 0F8912 points to a particular file within the file name "GIB_TOURISM_5" with a further pointer to memory location 0F8A20. At memory location 0F8A20 a new file name is provided, illustrated at column 3802 and again a new pointer is present at column 3803. Eventually, all relevant files will have been considered and the end of the list is identified by address 000000 at the pointer location in column 3803.

Figure 39:
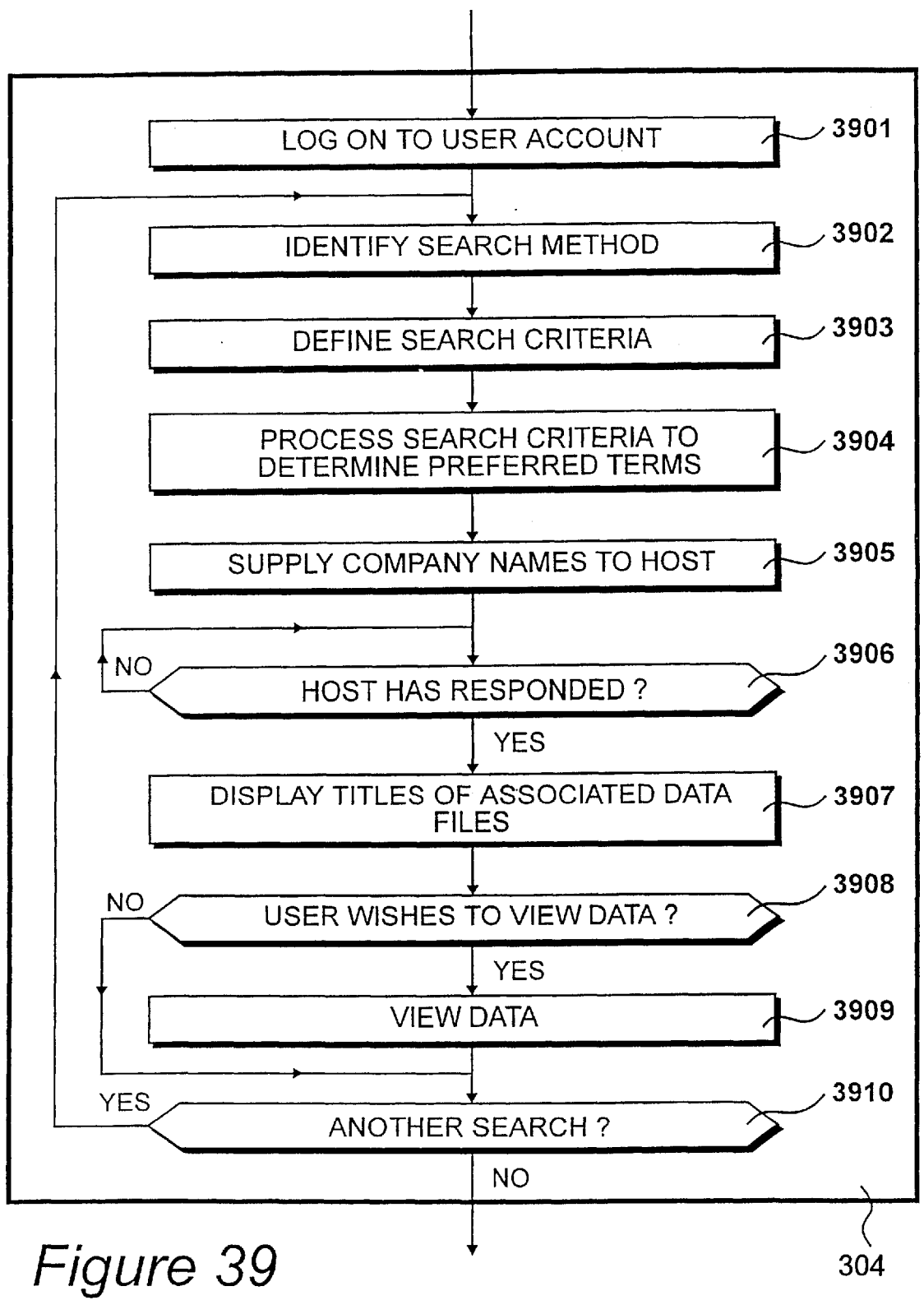
FIG. 39 details procedures identifying source files in response to a user request identified in FIG. 3.

With an active system, database 423 will be continually updated and users will continually be given access to the database, all under the control of the central processing system 405. Procedures 304 for identifying source files in response to user requests are detailed in FIG. 39. At step 3901 a user logs onto the system and at step 3902 a search method is identified. At step 3903 search criteria are defined and at step 3904 the search criteria are processed to determine preferred terms. At step 3905 a list of preferred terms are supplied to the central processing system 405.

At step 3906 a question is asked as to whether the host has responded and when answered in the affirmative titles of associated data files are displayed at step 3907. At step 3908 a question is asked as to whether the user wishes to view identified data and when answered in the affirmative the data is viewed. At step 3910 a question is asked as to whether another search is to be performed and when answered in the affirmative control is returned to step 3902.

Figure 40:
FIG. 40 illustrates a screen display generated by the requesting step shown in FIG. 39.

Step 3902 requires a search method to be identified and in order to achieve this a user is prompted by a screen display of the type shown in FIG. 40. Thus, a plurality of text boxes are presented to the user inviting said user to specify a search method.

Figure 41:
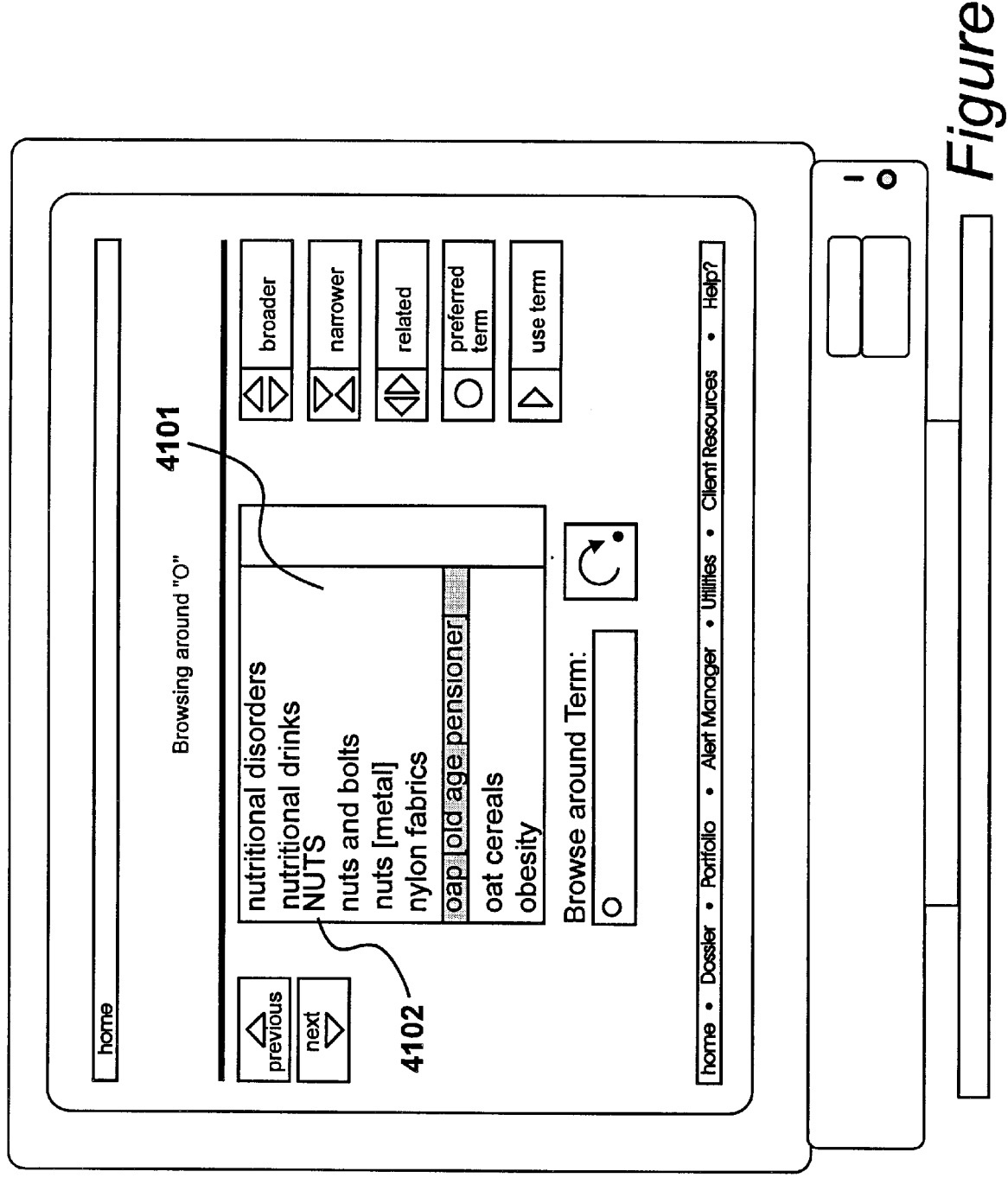
FIG. 41 details a screen for prompting search criteria generated by the criteria requesting step in FIG. 39.

Step 3903 for the defining of search criteria results in the user being prompted by a screen of the type shown in FIG. 41. Terms providing a basis for the user's search are displayed in a window 4101. Preferred terms are displayed in upper case characters, such as the entry shown at position 4102.

The displaying of titles of associated files at step 3907 results in the user seeing information displayed of the type illustrated in FIG. 42. Each entry, such as entry 4201, includes a check box 4202. Check boxes 4202 allow a particular item to be selected by a user that the actual information file may be supplied to the user from the central database.

We claim:

1. Apparatus arranged to receive data files from data sources and to categorize said data files to facilitate searching in response to user-requests, wherein said data files contain unspecified high value items whose characteristic rather than content may be of interest and high value to a user, said apparatus comprising:

identifying means for identifying occurrences within a received data file of unspecified candidate items in preferred contexts based on first rules likely to identify a preferred specified category, and for identifying occurrences within said received data file of said unspecified candidate items in non-preferred contexts based on second rules likely to identify a non-preferred specified category; and processing means for processing said preferred occurrences with said non-preferred occurrences for each of said unspecified candidate items and to select one of said unspecified candidate items as a high value item whose characteristic rather than content may be of interest and high value to a user.

2. Apparatus according to claim 1, wherein said identifying means is configured to identify occurrences of unspecified candidate terms for a plurality of non-preferred categories.

3. Apparatus according to claim 2, wherein said identifying means is configured to identify preferred categories representing companies and to identify non-preferred categories including place names and personal names.

4. Apparatus according to claim 1, wherein said processing means is configured to perform a plurality of processes to remove candidates to produce a refined list of high value items.

5. Apparatus according to claim 4, wherein said processing means is configured to increase score values in response to identifying occurrences and to process said score values.

6. Apparatus according to claim 5, wherein said processing means is configured to increase said score values non-linearly so as to restrain said scores within a predetermined maximum value.

7. Apparatus according to claim 4, wherein said processing means is configured to identify similar entries and to remove one or more of said similar entries in response to a score comparison.

8. Apparatus according to claim 7, wherein similar entries represent situations in which a first entry is the same as a second entry with an extension added thereto.

9. Apparatus according to claim 1, including first transmission means for continually supplying input data files from a plurality of sources.

10. Apparatus according to claim 1, including second transmission means for supplying information to users in response to user requests.

11. Apparatus according to claim 1, wherein said preferred contexts are defined by a first set of phrases, and said non-preferred contexts are defined by a second set of phrases, and said identifying means is configured to identify occurrences of unspecified candidate items in phrases defining preferred contexts and to identify occurrences of unspecified candidate items in phrases defining non-preferred contexts.

12. A method of analyzing data files containing representations of a natural language to identify unspecified high value items whose characteristic rather than content may be of interest and high value to a user, said method comprising:

identifying occurrences of unspecified candidate items within a data file in preferred contexts based on first rules likely to identify a preferred specified category;

identifying occurrences of unspecified candidate items within said data file in non-preferred contexts based on second rules likely to identify a non-preferred specified category;

processing said preferred occurrences with said non-preferred occurrences for each one of said unspecified candidate items; and selecting one of said unspecified candidate items as a high value item whose characteristic rather than content may be of interest and high value to a user.

13. A method according to claim 12, wherein occurrences of unspecified candidate terms are identified for a plurality of non-preferred categories.

14. A method according to claim 13, wherein the preferred category represents companies and said non-preferred categories include place names and personal names.

15. A method according to claim 12, wherein a plurality of processes are performed to remove candidates to produce a refined list of high value items.

16. A method according to claim 15, wherein identified occurrences result in score values being increased and said processing steps involve the processing of said score values.

17. A method according to claim 15, wherein said score values are increased non-linear so as to restrain said scores within a predetermined maximum value.

18. A method according to claim 15, wherein similar entries are identified and one or more of said similar entries are removed in response to a score comparison.

19. A method according to claim 18, wherein similar entries represent situations in which a first entries is the same as a second entry with an extension added thereto.

20. A method according to claim 12, wherein data files are continually received from a plurality of data sources.

21. A method according to claim 12, wherein information is supplied to users in response to user requests.

22. A method of analyzing data files according to claim 12, wherein said contexts for a preferred category are defined by a first set of phrases, and said contexts for a non-preferred category are defined by a second set of phrases, such that occurrences of said unspecified candidate items in phrases relating to a preferred category are identified, and occurrences of said unspecified candidate items in phrases relating to a non-preferred category are identified.

23. A computer system programmed to execute stored instructions such that in response to said stored instructions said system is configured to:

identify occurrences within a data file of unspecified candidate items in preferred contexts based on first rules likely to identify a preferred specified category;

identify occurrences within said data file of unspecified candidate items in non-preferred contexts based on second rules likely to identify a non-preferred specified category;

process said preferred occurrences with said non-preferred occurrences for each one of said unspecified candidate items; and select one of said unspecified candidate items as a high value item whose characteristic rather than content may be of interest and high value to a user.

24. A computer system programmed to execute stored instructions according to claim 23, configured to identify occurrences of unspecified candidate items for a plurality of non-preferred categories.

25. A computer system programmed to execute stored instructions according to claim 24, configured to identify preferred categories representing companies and to identify non-preferred categories including place names and personal names.

26. A computer system programmed to execute sorted instructions according to claim 23, configured to perform a plurality of processes to remove candidates to produce a refined list of high value items.

27. A computer system programmed to execute stored instructions according to claim 26, configured to increase score values in response to identifying occurrences and to process said score values.

28. A computer system programmed to execute stored instructions according to claim 27, configured to increase said score values non-linearly so as to restrain said scores within a predetermined maximum value.

29. A computer system programmed to execute stored instructions according to claim 26, configured to identify similar entries and to remove one or more of said similar entries in response to a score comparison.

30. A computer system programmed to execute stored instructions according to claim 29, configured to continually supply input data files from transmission means.

31. A computer system programmed to execute stored instructions according to claim 23, wherein said preferred contexts are defined by a first set of phrases, and said non-preferred contexts are defined by a second set of phrases, and said system is configured to identify occurrences of unspecified candidate items in phrases defining preferred contexts and to identify occurrences of unspecified candidate items in phrases defining non-preferred contexts.

32. A computer-readable medium having computer-readable instructions executable by a computer such that, when executing said instructions, the computer will perform the steps of:

identifying occurrences within a data file of unspecified candidate items in preferred contexts based on first rules likely to identify a preferred specified category;

identifying occurrences within said data file of unspecified candidate items in non-preferred contexts based on second rules likely to identify a non-preferred specified category;

processing said preferred occurrences with said non-preferred occurrences for each one of said unspecified candidate items; and selecting one of said unspecified candidate items as a high value item whose characteristic rather than content may be of interest and high value to a user.

33. A computer-readable medium having computer-readable instructions according to claim 32, such that when executing said instructions a computer will also perform the step of identifying occurrences of unspecified candidate terms for a plurality of non-preferred categories.

34. A computer-readable medium having computer-readable instructions according to claim 33, such that when executing said instructions a computer will also perform the step of processing preferred categories representing companies and representing non-preferred categories representing place names and personal names.

35. A computer-readable medium having computer-readable instructions according to claim 32, such that when executing said instructions a computer will also perform the step of performing a plurality of processes to remove candidates and to produce a refine list of high-value items.

36. A computer-readable medium having computer-readable instructions according to claim 35, such that when executing said instructions a computer will also perform the step of increasing score values as a result of occurrences being identified and processing said score values.

37. A computer-readable medium having computer-readable instructions according to claim 36, such that when executing said instructions a computer will also perform the step of non-linearly increasing said score values so as to restrain said scores within a predetermined maximum value.

38. A computer-readable medium having computer-readable instructions according to claim 35, such that when executing said instructions a computer will also perform the step of identifying similar entries and removing one or more of said similar entries in response to a score comparison.

39. A computer-readable medium having computer-readable instructions according to claim 38, such that when executing said instructions a computer will also perform the step of identifying similar entries representing situations in which a first entry is the same as a second entry with an extension added thereto.

40. A computer-readable medium having computer-readable instructions according to claim 32, such that when executing said instructions a computer will also perform the step of continually receiving data files from a plurality of data sources.

41. A computer-readable medium having computer-readable instructions according to claim 32, such that when executing said instructions a computer will also perform the step of supplying information to users in response to user requests.

42. A computer readable medium having computer readable instructions according to claim 32, wherein said contexts for a preferred category are defined by a first set of phrases, and said contexts for a non-preferred category are defined by a second set of phrases, such that occurrences of said unspecified candidate items in phrases relating to a preferred category are identified, and occurrences of said unspecified candidate items in phrases relating to a non-preferred category are identified.

* * * * *